United States Patent
Nakajima et al.

(10) Patent No.: US 9,577,781 B2
(45) Date of Patent: Feb. 21, 2017

(54) OPTICAL TRANSMISSION APPARATUS AND OPTICAL TRANSMISSION CONTROL METHOD

(71) Applicant: FUJITSU LIMITED, Kawasaki-shi, Kanagawa (JP)

(72) Inventors: Ichiro Nakajima, Koto (JP); Kazuaki Nagamine, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/831,245

(22) Filed: Aug. 20, 2015

(65) Prior Publication Data

US 2016/0094306 A1 Mar. 31, 2016

(30) Foreign Application Priority Data

Sep. 25, 2014 (JP) ................................ 2014-194700

(51) Int. Cl.
*H04J 14/02* (2006.01)

(52) U.S. Cl.
CPC ........ *H04J 14/0221* (2013.01); *H04J 14/0212* (2013.01)

(58) Field of Classification Search
CPC .. H04J 14/0221; H04J 14/0204; H04J 14/0212; H04J 14/021; H04B 10/0795; H04B 10/07955
USPC ............. 398/79, 83, 82, 85, 87, 33, 38, 158, 159,398/160, 10, 13, 17, 34; 385/24, 37, 16, 17, 18
See application file for complete search history.

(56) References Cited

U.S. PATENT DOCUMENTS

| | | | | |
|---|---|---|---|---|
| 7,526,200 | B2* | 4/2009 | Nakano | H04B 10/506 398/10 |
| 2009/0162067 | A1* | 6/2009 | Kobayashi | H04J 14/0204 398/79 |
| 2010/0150563 | A1* | 6/2010 | Nakajima | H04B 10/07955 398/81 |
| 2013/0121691 | A1 | 5/2013 | Oda et al. | |

FOREIGN PATENT DOCUMENTS

JP 2013-106328 5/2013

OTHER PUBLICATIONS

Proietti, Roberto, et al.; "Rapid and complete hitless defragmentation method using a coherent RX LO with fast wavelength tracking in elastic optical networks", Nov. 19, 2012, vol. 20, No, 24, Optics Express pp. 26958-26968.

(Continued)

*Primary Examiner* — Hanh Phan
(74) *Attorney, Agent, or Firm* — Staas & Halsey LLP

(57) ABSTRACT

An optical transmission apparatus includes: a variable optical attenuation section configured to independently adjust, for each wavelength, attenuation of light of a plurality of wavelengths and adjust output optical power of wavelength multiplexed light that is output to an optical transmission line by adjustment of the attenuation; and a control section configured to stop, in accordance with control in which a wavelength included in the wavelength multiplexed light in a first wavelength band is wavelength-shifted to a second wavelength band that is different from the first wavelength band, adjustment of attenuation performed on the first wavelength band by the variable optical attenuation section.

9 Claims, 19 Drawing Sheets

(56) References Cited

OTHER PUBLICATIONS

Cugini, et al.; "Push-Pull Technique for Defragmentation in Flexible Optical Networks", OFC/NFOEC Technical Digest, 2012, OSA.
Sone, Kyosuke, et al.; "First Demonstration of Hitless Spectrum Defragmentation using Real-time Coherent Receivers in Flexible Grid Optical Networks", in Proc. of ECOC 2012, paper Th.3.D.1, Sep. 2012.

\* cited by examiner

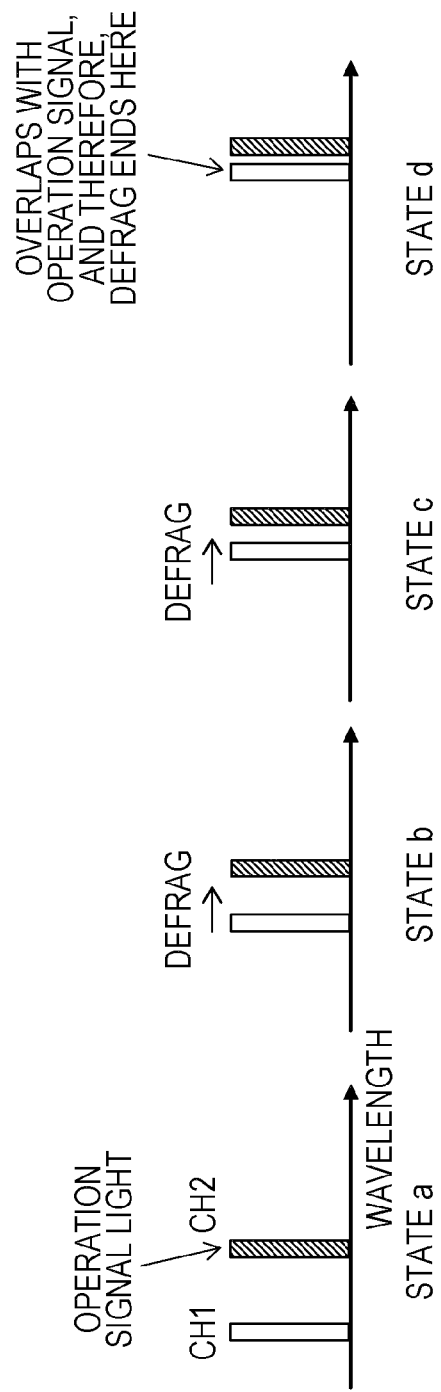

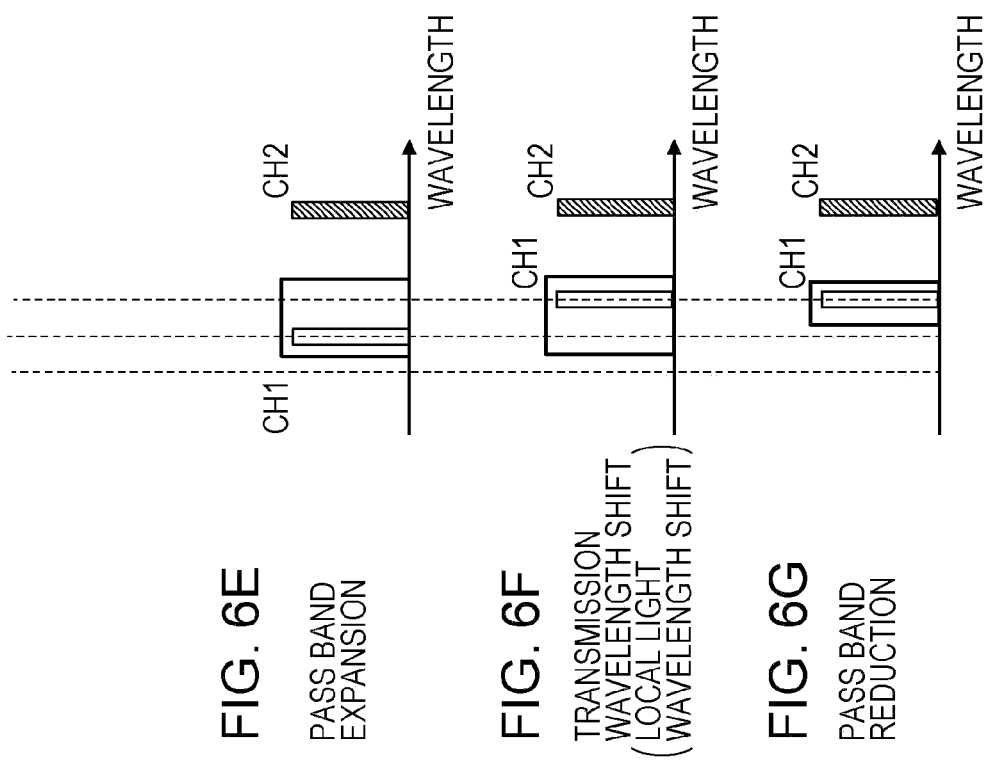
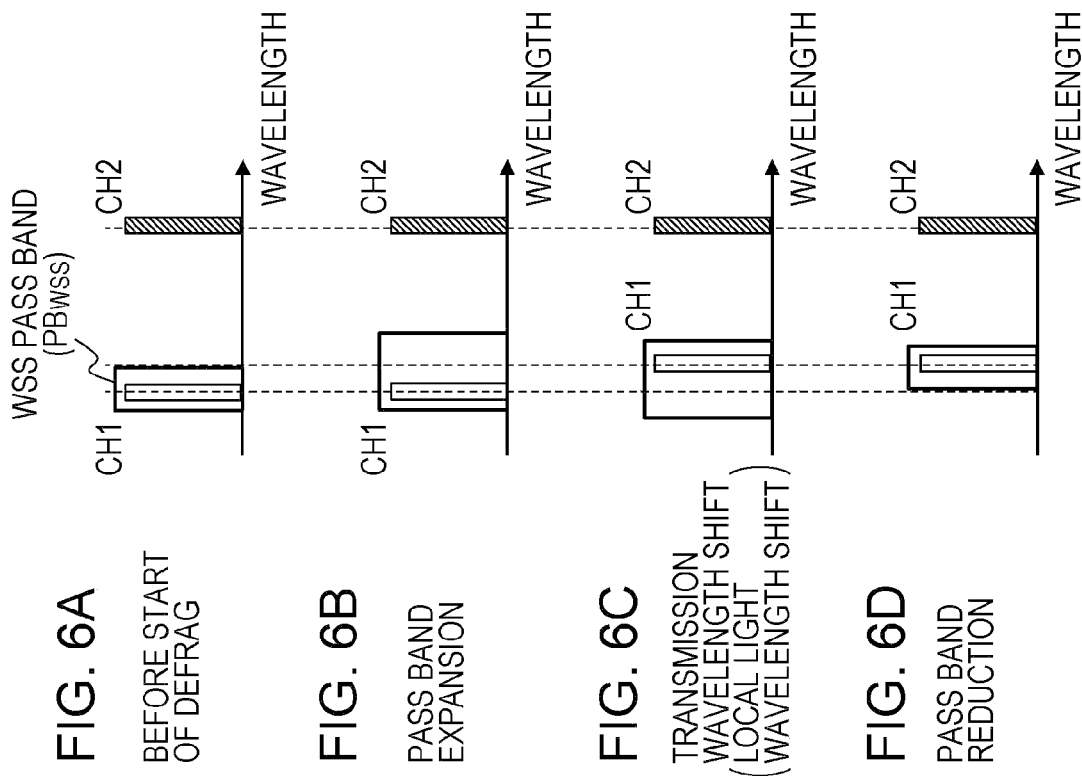
FIG. 6A BEFORE START OF DEFRAG
FIG. 6B PASS BAND EXPANSION
FIG. 6C TRANSMISSION WAVELENGTH SHIFT (LOCAL LIGHT WAVELENGTH SHIFT)
FIG. 6D PASS BAND REDUCTION
FIG. 6E PASS BAND EXPANSION
FIG. 6F TRANSMISSION WAVELENGTH SHIFT (LOCAL LIGHT WAVELENGTH SHIFT)
FIG. 6G PASS BAND REDUCTION

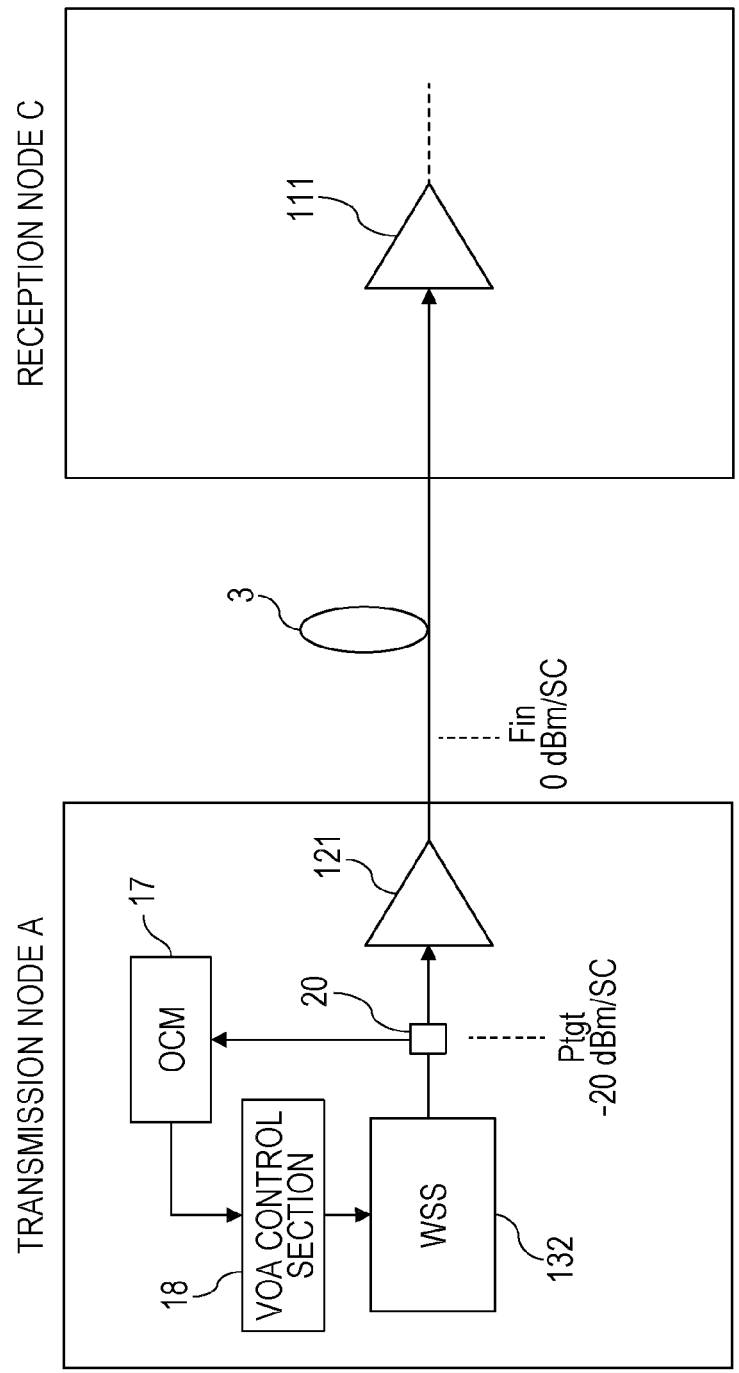

FIG. 18

| | IN DEFRAG SOURCE BAND | WHEN OVERLAPPING INSIDE AND OUTSIDE OF DEFRAG SOURCE BAND | BAND BETWEEN DEFRAG SOURCE BAND AND DEFRAG TARGET BAND | WHEN OVERLAPPING INSIDE AND OUTSIDE OF DEFRAG TARGET BAND | IN DEFRAG TARGET BAND |
|---|---|---|---|---|---|
| BEFORE START OF DEFRAG (NORMAL TIME) | SUPER CHANNEL LEVEL UNIFORM CONTROL | — | — | — | — |
| DURING DEFRAG SC#4 | LOSS UNIFORM CONTROL | LOSS UNIFORM CONTROL | SUBCARRIER LEVEL UNIFORM CONTROL | SUBCARRIER LEVEL UNIFORM CONTROL | SUPER CHANNEL LEVEL UNIFORM CONTROL |
| DURING DEFRAG SC#3, SC#2 | LOSS UNIFORM CONTROL | LOSS UNIFORM CONTROL | SUBCARRIER LEVEL UNIFORM CONTROL | LOSS UNIFORM CONTROL | SUPER CHANNEL LEVEL UNIFORM CONTROL |
| DURING DEFRAG SC#1 | SUPER CHANNEL LEVEL UNIFORM CONTROL | SUBCARRIER LEVEL UNIFORM CONTROL | SUBCARRIER LEVEL UNIFORM CONTROL | LOSS UNIFORM CONTROL | SUPER CHANNEL LEVEL UNIFORM CONTROL |
| AFTER END OF DEFRAG (NORMAL TIME) | — | — | — | — | SUPER CHANNEL LEVEL UNIFORM CONTROL |

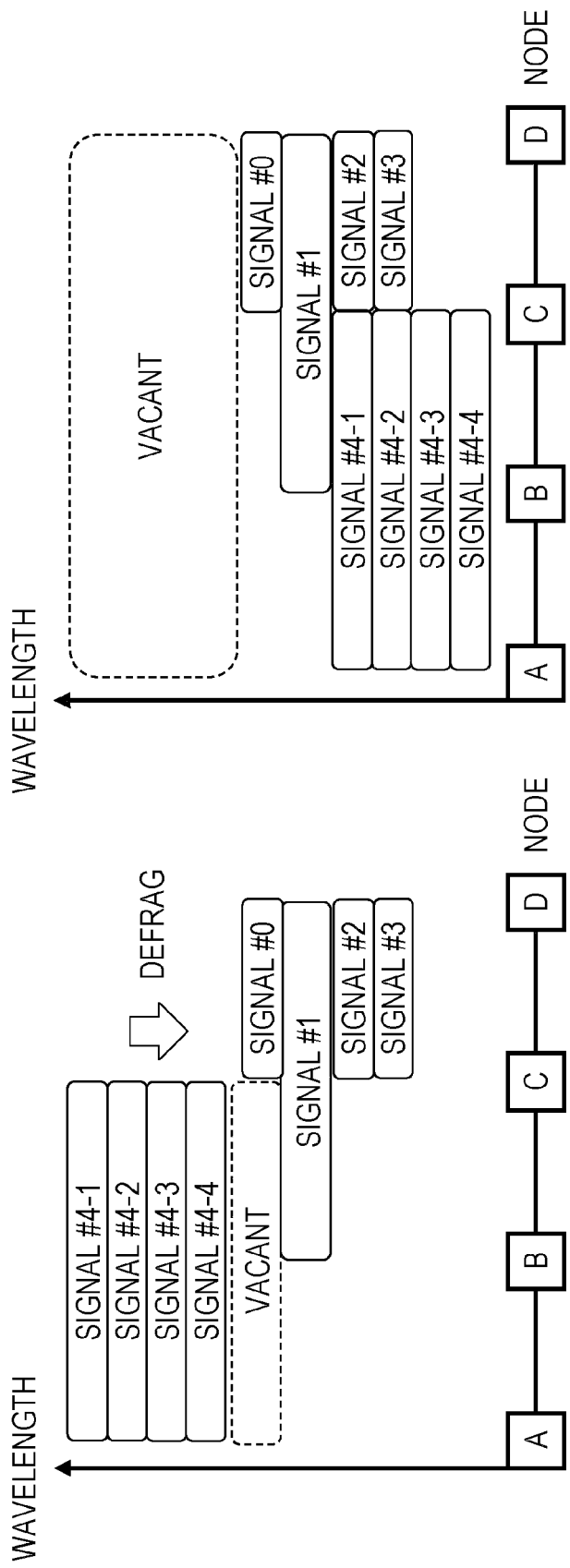

OPTICAL TRANSMISSION APPARATUS AND OPTICAL TRANSMISSION CONTROL METHOD

CROSS-REFERENCE TO RELATED APPLICATION

This application is based upon and claims the benefit of priority of the prior Japanese Patent Application No. 2014-194700, filed on Sep. 25, 2014, the entire contents of which are incorporated herein by reference.

FIELD

The embodiment discussed herein is related to an optical transmission apparatus and an optical transmission control method.

BACKGROUND

The construction of optical transmission networks based on wavelength division multiplexing (WDM) technology has been advanced, and optical add-drop multiplexers (OADM) capable of inserting (adding) and branching (dropping) light included in WDM light in units of wavelength have been actively developed and introduced.

In recent years, flexible grid technology that enables arbitrarily setting of wavelength intervals and optimization of frequency usage efficiency, and signal speed increase technology using waveform shaping processing or the like by digital signal processing have been studied.

For example, the development of optical transmission apparatuses that support transmission speed of 100 gigabits/second (Gbps) per wavelength have has been advanced. Also, it has been examined to put an optical transmission apparatus that multiplexes a plurality of wavelengths to support larger capacity and higher speed optical transmission, that is, optical transmission at 400 Gbps, 1 terra (T) bps, or the like, into practical use.

Such larger capacity and higher speed optical transmission is occasionally referred to as "super channel" transmission, in contrast to normal WDM transmission. In a "super channel", while inter-wavelength interference is reduced by using waveform shaping processing by digital signal processing, a wavelength arrangement interval may be reduced to a smaller interval than that of normal WDM.

Therefore, in super channel transmission, it is possible to increase, as compared to normal WDM transmission, usage efficiency for a wavelength (frequency) resource in a pass band. Note that a wavelength included in a super channel is occasionally referred to as a "subcarrier (SC)". Therefore, super channel transmission may be referred to as "multicarrier transmission".

As one of technologies used for increasing usage efficiency for a wavelength resource in a pass band, a technology called "flexible grid" is known. In accordance with the flexible grid technology, an interval between adjacent wavelengths may be arbitrarily set (made variable).

Since a wavelength interval may be made variable, in the flexible grid technology, a fragmented vacant wavelength band tends to be generated. Thus, a technology called "wavelength defragmentation" used for putting as many fragmented vacant wavelength bands as possible together by rearrangement (which may be referred to as "wavelength shift") has been studied.

By putting vacant wavelength bands together, for example, accommodation of a new signal optical wavelength in the vacant wavelength bands may be made easier and thus frequency usage efficiency of a pass band may be increased. Note that the "wavelength defragmentation" may be referred to as "wavelength defrag" or may be abbreviated merely as "defrag".

Japanese Laid-Open Patent Publication No. 2013-106328 discusses related art.

Also, F. Cugini et al., "Push-Pull Technique for Defragmentation in Flexible Optical Networks", OFC/NFOEC Technical Digest, 2012, OSA, Roberto Proietti et al., "Rapid and complete hitless defragmentation method using a coherent RX LO with fast wavelength tracking in elastic optical networks", 19 Nov. 2012, Vol. 20, No. 24/OPTICS EXPRESS pp. 26958-26968, and Kyosuke Sone et al., "First Demonstration of Hitless Spectrum Defragmentation using Real-time Coherent Receivers in Flexible Grid Optical Networks", in Proc. Of ECOC 2012, paper Th.3.D.1, September 2012 also discuss related art.

In conventional technologies, there has been no study at all conducted to examine a probability in which, when wavelength shift is performed on a wavelength (a subcarrier) included in a super channel by wavelength defrag, output optical power to an optical transmission line fluctuates and thus signal quality is degraded.

SUMMARY

According to an aspect of the embodiments, an apparatus includes: a variable optical attenuation section configured to independently adjust, for each wavelength, attenuation of light of a plurality of wavelengths and adjust output optical power of wavelength multiplexed light that is output to an optical transmission line by adjustment of the attenuation; and a control section configured to stop, in accordance with control in which a wavelengths included in the wavelength multiplexed light in a first wavelength band is wavelength-shifted to a second wavelength band that is different from the first wavelength band, adjustment of attenuation performed on the first wavelength band by the variable optical attenuation section.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram schematically illustrating an example of wavelength defrag;

FIGS. 6A, 6B, 6C, 6D, 6E, 6F, and 6G are diagrams schematically illustrating examples of wavelength defrag with focus on a WSS pass band;

FIG. 7 is a block diagram illustrating an example of output optical power control of the optical transmission apparatus illustrated in FIG. 1;

FIG. 18 is a table illustrating a summary of output optical power control separately performed for each wavelength band illustrated in FIG. 15 to FIG. 17; and FIGS. 19A and 19B are diagrams illustrating an example of wavelength defrag.

DESCRIPTION OF EMBODIMENTS

Figure 1:
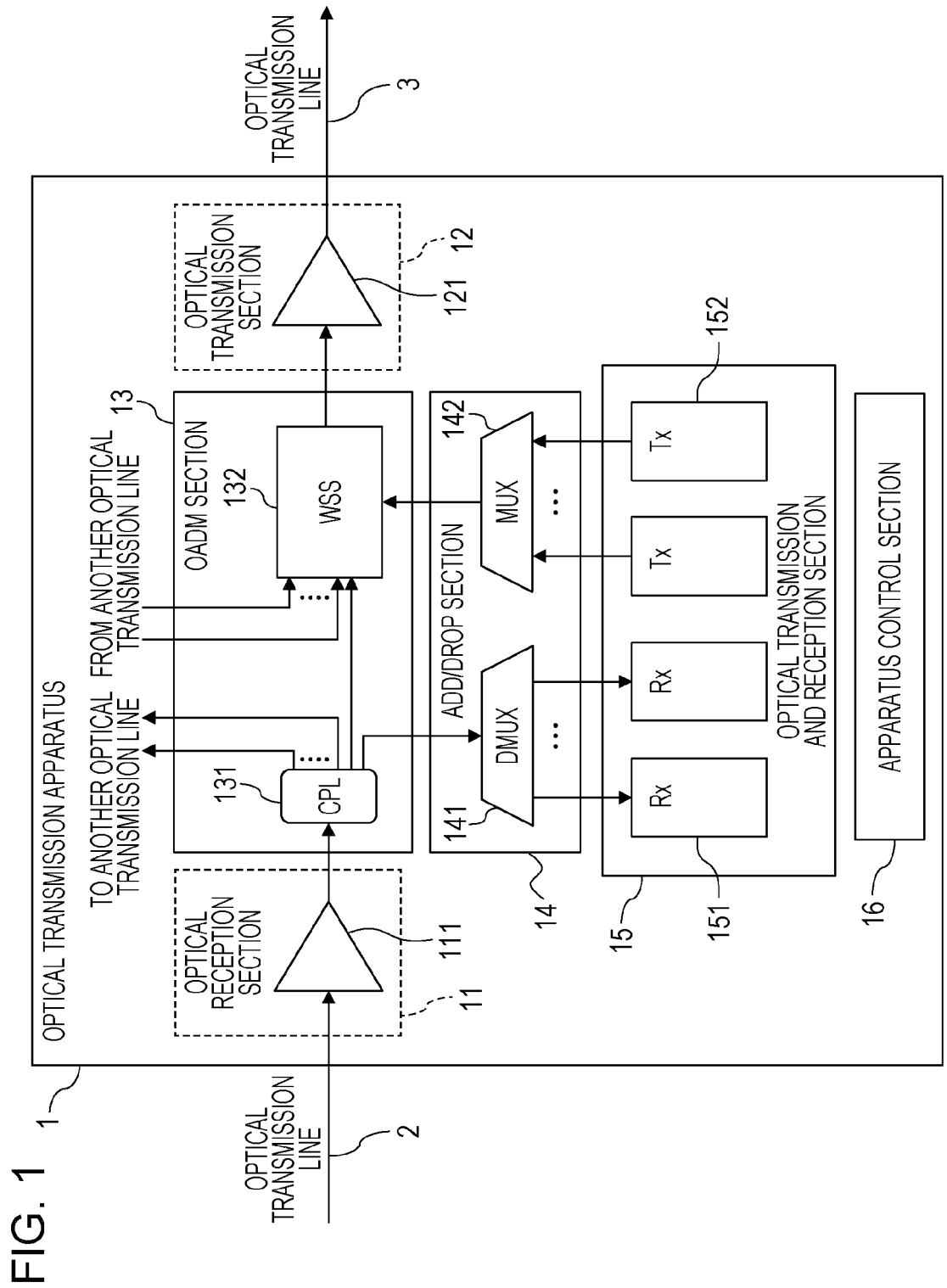
FIG. 1 is a block diagram illustrating a configuration example of an optical transmission apparatus according to an embodiment.

An embodiment will be described below with reference to the accompanying drawings. The following embodiment is provided merely for illustrative purpose and is not intended to exclude the application of various modifications and techniques that are not illustrated below. Also, various illustrative aspects described below may be combined with one another, as appropriate, and be thus implemented. Note that, in the drawings used in the following embodiment, each part denoted by the same reference character represents the same or a similar part, unless specifically stated otherwise.

In a current optical add-drop multiplexer (OADM), wavelength intervals of light included in WDM light are set to equal intervals (for example, 50 GHz, 100 GHz, or the like). In contrast, in order to support optical interfaces for various different communication capacities, which have different transmission rates and use different optical modulation methods, a technology called "flexible grid" is standardized by ITU-T (ITU-T G.694.1).

In order to increase the transmission capacity of a WDM optical network, similar to the development of high speed signal technology allowing a 400 Gbps signal, a 1 Tbps signal, or like signal, it is also important to develop the "flexible grid" technology which enables increase in wavelength accommodation efficiency in an optical pass band.

In an optical network (which will be hereinafter referred to as a "flexible grid network" occasionally) using the flexible grid technology, unlike normal WDM transmission, an interval between adjacent wavelengths is not fixed but may be arbitrarily set (made variable). For example, in "ITU-T G.694.1", it is defined that an interval between adjacent wavelengths may be set to a 6.25 GHz width or an integral multiple of a 12.5 GHz width.

Therefore, in the flexible grid technology, in a pass band, a wavelength arrangement tends to be discontinuous, as compared to the normal WDM technology, and segmentalized vacant wavelength bands (which may be referred to as a "vacant region") tend to be dispersedly generated in the pass band. Such a phenomenon may be referred to as "segmentalization" of a vacant region.

As many as segmentalized vacant regions possible are put together by rearrangement of wavelengths, and thus, a new signal optical wavelength is easily accommodated in the vacant regions that have been put together, so that frequency usage efficiency in the pass band may be increased.

Thus, the technology in which as many as segmentalized vacant regions possible are put together by rearrangement of wavelengths is occasionally called "wavelength defragmentation". "Wavelength defragmentation" will be hereinafter referred to as "wavelength defrag" or abbreviated as merely "defrag" occasionally.

When the transmission rate of a signal is increased, for example, to 400 Gpbs or 1 Tbps, it is difficult to transmit the signal with a single waveform. Thus, multicarrier transmission in which a single signal is allocated to a plurality of wavelengths (multicarrier) and is thus transmitted has been examined. The above-described super channel transmission is an example of multicarrier transmission.

Unlike normal WDM transmission, in order to optimize transmission characteristics, there might be cases where a plurality of wavelengths (which may be referred to as "subcarriers") that form a super channel is not arranged at equal intervals in a pass band. Furthermore, also, there might be cases where subcarriers are arranged at specified frequency grids, that is, at 6.25 GHz intervals or at intervals of an integral multiple of a 12.5 GHz width.

Therefore, it is difficult and also not realistic to implement transmission optical power control and the like for each subcarrier in super channel transmission. Therefore, in super channel transmission, it is examined to collectively implement transmission optical power control and the like in units of super channel which is formed by the plurality of subcarriers that have been put together.

In contrast, defrag is implemented for each subcarrier. Therefore, how super channel transmission control during implementation of defrag is implemented is a matter to be examined. For example, if, when transmission optical power in units of super channel is controlled to a target value, the number of subcarriers is changed due to defrag or the like, the target value of the transmission optical power in units of super channel deviates from an expected value.

Therefore, output optical power to the optical transmission line fluctuates during defrag, for example, so that a penalty of an optical signal due to nonlinear effect might be increased, an optical signal versus noise ratio (OSNR) might be degraded, and signal quality might be degraded.

Thus, in this embodiment, even when the number of subcarriers forming a super channel changes due to defrag or the like, fluctuation of the output optical power to the optical transmission line is reduced to reduce degradation of signal quality.

FIG. 1 illustrates a configuration example of an optical transmission apparatus according to an embodiment. An optical transmission apparatus 1 illustrated in FIG. 1 is illustratively an OADM, and includes an optical reception section 11, an optical transmission section 12, an OADM section 13, an add/drop section 14, an optical transmission and reception section 15, and an apparatus control section 16. The apparatus control section 16 may utilize a processor, an FPGA (field-programmable gate array) and/or a circuit. Note that an "optical transmission apparatus" may be referred to as an "optical transmission node" or merely a "node".

The optical reception section 11 receives WDM light transmitted through an input optical transmission line 2 and amplifies the WDM light. Therefore, the optical reception section 11 may include an optical amplifier (an optical amp) 111. The optical amp 111 may be also referred to as a pre-amp 111 (or a reception amp 111).

The optical transmission section 12 amplifies transmission WDM light input from the OADM section 13 and transmits the amplified transmission WDM light to an output optical transmission line 3. Therefore, the optical transmission section 12 may include an optical amplifier (an optical amp) 121. The optical amp 121 may be also referred to as a post-amp 121 (or a transmission amp 121).

The OADM section 13 has a function of dropping, adding, and letting pass-through of light of a wavelength included in the WDM light. For example, the OADM section 13 is capable of transmitting reception WDM light input from the optical reception section 11 to another optical transmission light, branching (dropping) the WDM light to the add/drop section 14, and letting the WDM light pass therethrough to the optical transmission section 12 in units of wavelength of light included in the WDM light. Note that "another optical transmission line" is illustratively an optical transmission line corresponding to a route (a degree), which is different from the optical transmission lines 2 and 3.

Also, the OADM section 13 is capable of inserting (adding) WDM light received from another optical transmission line and transmission light from the add/drop section 14 in reception WDM light input from the optical reception section 11 in units of wavelength. Also, the OADM section 13 is capable of letting light input from the optical reception section 11 pass therethrough to the optical transmission section 12 in units of wavelength.

Therefore, as illustrated in FIG. 1, the OADM section 13 may include an optical coupler (CPL) 131 and a wavelength selection switch (WSS) 132. However, the configuration of the OADM section 13 is not limited to the configuration illustrated in FIG. 1.

The optical coupler 131 branches WDM light input from the optical reception section 11 and outputs branched light to the add/drop section 14, the WSS 132, and another optical transmission line. The branched light output to the add/drop section 14 may be referred to as "drop light" and the branched light output to the WSS 132 may be referred to as "through light". Note that the optical coupler 131 may be substituted with the WSS.

The WSS 132 selects and outputs through light input from the optical coupler 131, add light input from the add/drop section 14, and WDM light input from another optical transmission line to the optical transmission section 12 in units of wavelength.

Therefore, the WSS 132 may illustratively have a function of connecting WDM light input to an input port to a different output port for each wavelength and a function of adjusting transmitted light power (that is, in other words, attenuation or loss of light) for each wavelength.

The former function of providing connection between the input and output ports may be referred to as a "port switch function" or an "optical switch function". The latter function of adjusting transmitted light power may be referred to as an attenuation function. With focus on the attenuation function, the WSS 132 is an example of a variable optical attenuation section.

The optical switch function and the attenuation function of the WSS 132 may be realized illustratively using an element (which may be referred to as a "spatial light modulation element") that is capable of making a reflection direction of input light (a beam) spatially variable to change an internal optical path.

Examples of the spatial light modulation element include elements using liquid crystal on silicon (LCOS) technology and micro electro mechanical system (MEMS) technology. The spatial light modulation element may adjust the spatial reflection direction of an input optical beam, thereby adjusting the wavelength and optical power of an optical beam that connects to an output port.

Therefore, the spatial light modulation element is capable of making the pass band of light to the output port variable and making the power (that is, in another word, attenuation) of light output from the output port variable.

By using the above-described spatial light modulation element for the WSS 132, support of the above-described "flexible grid" is enabled in the optical transmission apparatus 1 (illustratively, in the OADM section 13). Note that the pass band of the WSS 132 will be occasionally referred to as a "WSS pass band".

Figure 2:
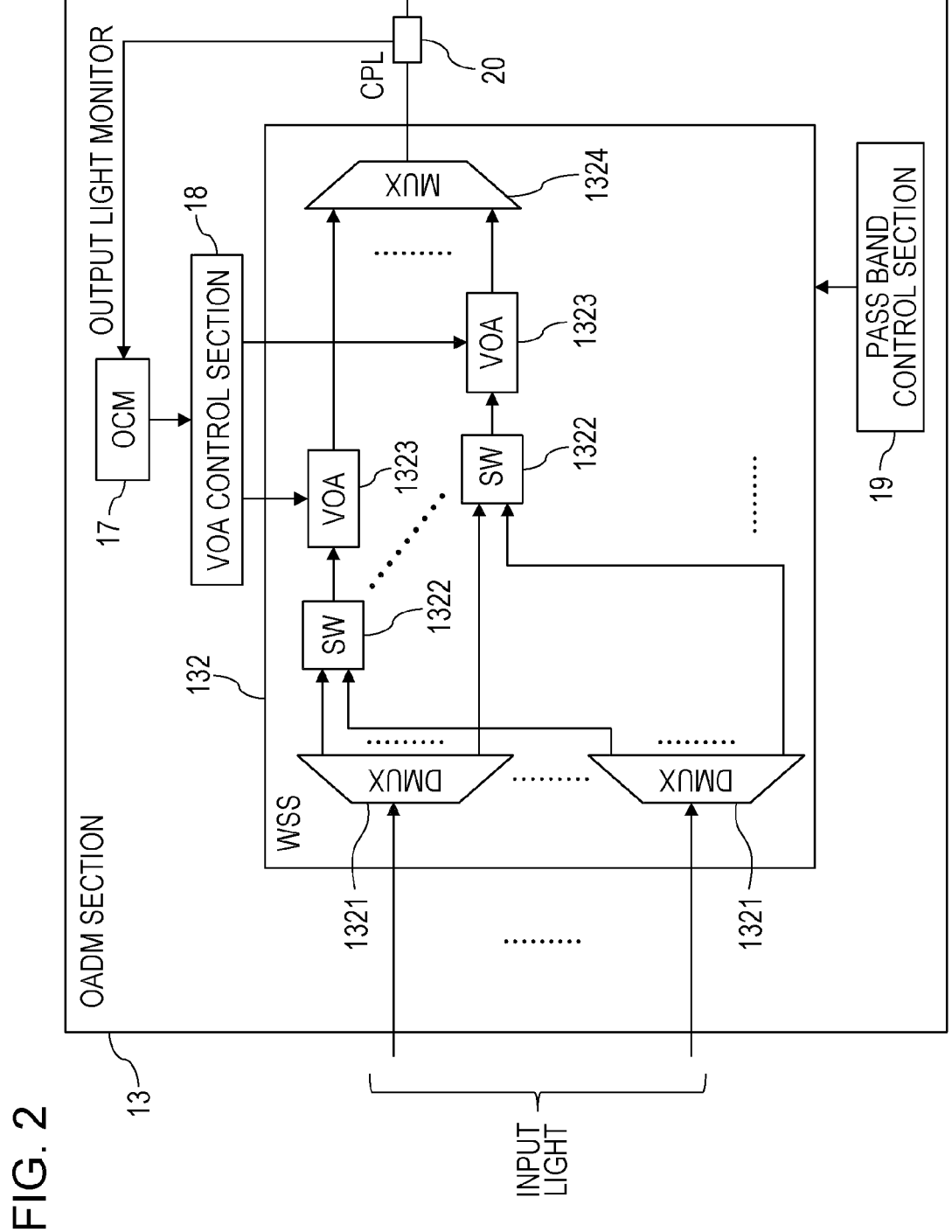
FIG. 2 is a block diagram with focus on a functional configuration example of a wavelength selection switch (WSS) illustrated in FIG. 1.

FIG. 2 illustrates a block diagram with focus on a functional configuration example of the WSS 132. As illustrated in FIG. 2, in a functional view, the WSS 132 includes a wavelength separator (a demultiplexer: DMUX) 1321, an optical switch (SW) 1322, a variable optical attenuator (VOA) 1323, and a wavelength multiplexer (a multiplexer: MUX) 1324.

Each of the demultiplexer 1321, the optical switch 1322, and the VOA 1323 is illustratively provided in a number corresponding to the number (that may be considered to correspond to the number of input ports) of optical signals input to the WSS 132. An optical signal input to an input port of the WSS 132 is illustratively one of add light, through light, and hub light connecting between different optical transmission lines.

After being separated by the demultiplexer 1321 for each wavelength, the add light, the through light, and the hub light are input to the optical switch 1322, and which one of the add light, the through light, and the hub light is to let pass is selected by the optical switch 1322. It may be considered that the demultiplexer 1321 and the optical switch 1322 correspond to the above-described "port switch function".

The attenuation of light that has passed through the optical switch 1322 is adjusted by the VOA 1323, and then, the light is input to the multiplexer 1324, is wavelength-multiplexed by the multiplexer 1324, and is output to the optical transmission section 12 (see FIG. 1). It may be considered that the VOA 1323 corresponds to the above-described "attenuation function".

It may be considered that the demultiplexer 1321, the optical switch 1322, the VOA 1323, and the multiplexer 1324, which have been described above, correspond to the above-described spatial light modulation element. Therefore, the WSS 132 is an example of a sophisticated optical device including various functions of the special light modulation element in an integrated manner. By applying such a WSS 132 to an optical switch functional part of a node 1, the extensibility of the node 1 may be increased and cost cut may be achieved.

Note that wavelength selection performed by the optical switch 1322 may be illustratively controlled by a pass band control section 19. Also, the attenuation (which may be referred to a "VOA loss") of the VOA 1323 may be illustratively controlled by a VOA control section 18. The VOA control section 18 may utilize a processor, an FPGA and/or a circuit.

The VOA control section 18 controls a VOA loss, for example, based on a monitor value of an optical channel monitor (OCM) 17, such that output optical power (which will be hereinafter referred to as "WSS output optical power" occasionally) of the WSS 132 matches target power.

Note that the OCM 17 is capable of monitoring output optical power of the WSS 132 for each wavelength. Output light of the WSS 132 is partially branched (which may be referred to as "tapped"), for example, by an optical coupler 20 and branched light is input as monitor light to the OCM 17.

One or both of the VOA control section 18 and the pass band control section 19 may be a control section or control sections separate from the apparatus control section 16 illustrated in FIG. 1, and may be incorporated in the apparatus control section 16 as a function of the apparatus control section 16. The pass band control section 19 may utilize a processor, an FPGA and/or a circuit.

Next, returning to the description of FIG. 1, the add/drop section 14 illustratively includes a wavelength separator (a demultiplexer: DMUX) 141 and a wavelength multiplexer (a multiplexer: MUX) 142.

The demultiplexer 141 wavelength-separates drop light input from the optical coupler 131 of the OADM section 13 to an optical receiver (Rx) 151 of the optical transmission and reception section 15. Note that, as will be described later, if the optical receiver 151 is capable of coherent reception, the optical receiver 151 is capable of selectively receiving light of a specific reception wavelength even when light of a plurality of wavelengths is input. Therefore, the demultiplexer 141 may be substituted with an optical coupler that branches input drop light to the optical receiver 151.

The multiplexer 142 wavelength-multiplexes add light input from an optical transmitter (Tx) 152 of the optical transmission and reception section 15 and outputs the wavelength-multiplexed add light to the WSS 132 of the OADM section 13.

Note that one or both of the demultiplexer 141 and the multiplexer 142 may be configured using a filter, such as a WSS, and the like, which is capable of making a signal pass band variable, an optical coupler, or the like.

The optical transmission and reception section 15 may be referred to as a transponder 15, and illustratively includes one or more optical receivers (Rx) 151, as an example of the optical reception section, and one or more optical transmitters (Tx) 152, as an example of the optical transmission section.

Figure 3B:
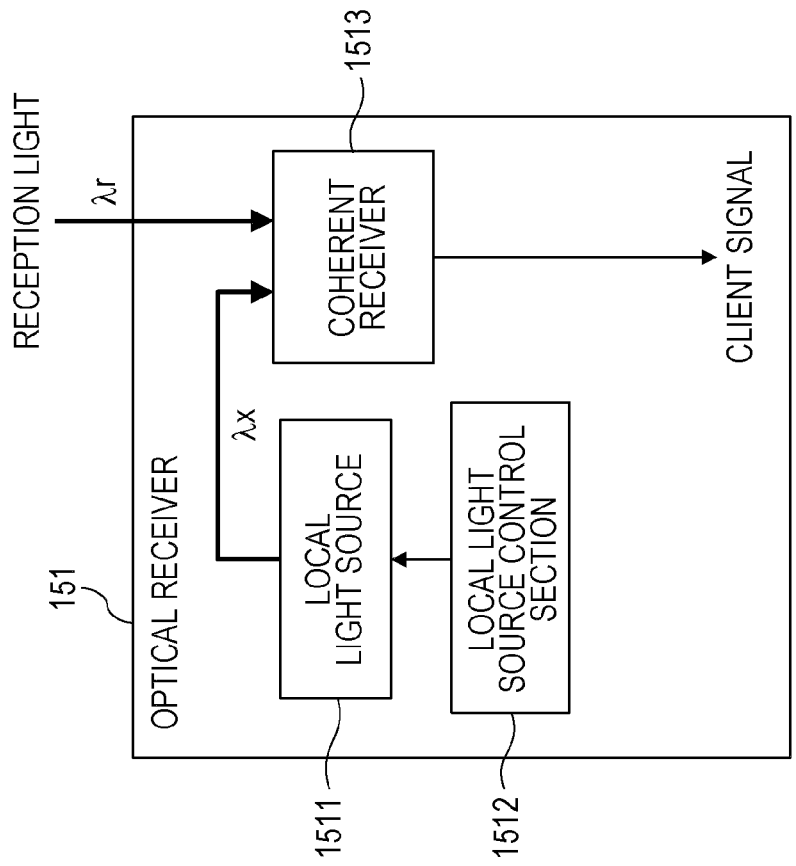
FIG. 3B is a block diagram illustrating a configuration example of an optical receiver (Rx) illustrated in FIG. 1.
Figure 3A:
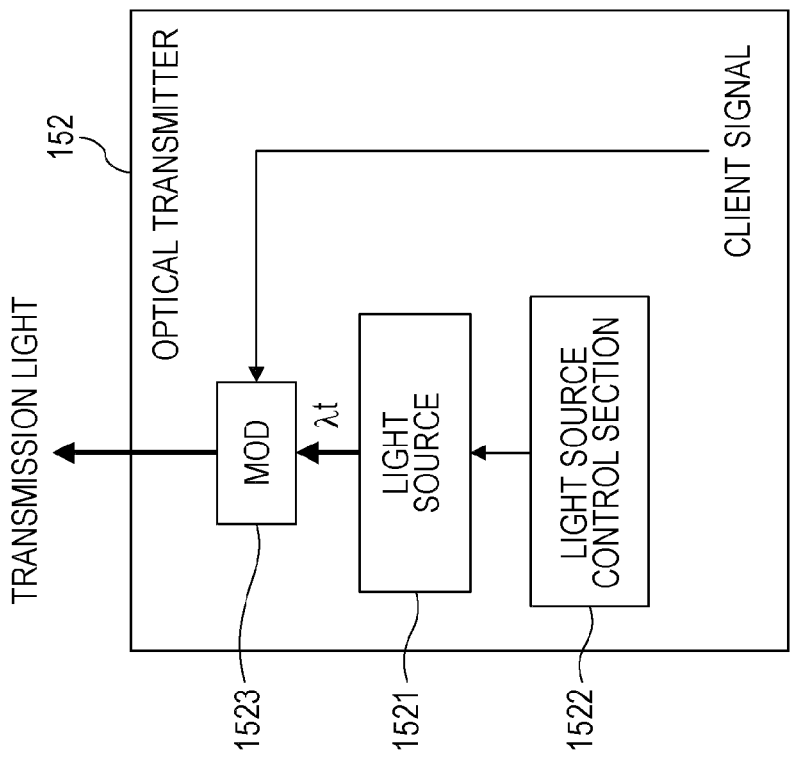
FIG. 3A is a block diagram illustrating a configuration example of an optical transmitter (Tx) illustrated in FIG. 1

For example, as illustrated in FIG. 3A, the optical transmitter 152 includes a light source 1521, a light source control section 1522, and an optical modulator (MOD) 1523.

The light source 1521 emits light of a wavelength ($\lambda$t). A tunable laser diode (LD) an emission wavelength of which is variable may be illustratively used for the light source 1521.

The light source control section 1522 controls an emission wavelength (which may be referred to as a "transmission wavelength") of the light source 1521.

The optical modulator 1523 generates a transmission modulation optical signal by modulating light of a transmission wavelength $\lambda$t from the light source 1521 with a transmission data signal (which may be, for example, a client signal). The transmission modulation optical signal is input as add light to the multiplexer 142 of the add/drop section 14.

On the other hand, for example, as illustrated in FIG. 3B, the optical receiver 151 includes a local light source 1511, a local light source control section 1512, and a coherent receiver 1513.

The local light source 1511 emits light (which may be referred to as "local light" of a wavelength ($\lambda$x)). A tunable LD an emission wavelength of which is variable may be illustratively used for the local light source 1511. The local light is used for coherent reception in the coherent receiver 1513.

The local light source control section 1512 controls (sets) the emission wavelength ($\lambda$x) of the local light source 1511 to a wavelength (which may be referred to as a "reception wavelength") ($\lambda$r) corresponding to a reception desired channel.

The coherent receiver 1513 causes local light from the local light source 1511, which has been set to the reception wavelength $\lambda$r, and a reception WDM optical signal to interfere each other in the same phase or different phases (for example, phases different from each other by 90 degrees) by optical phase hybrid. Thus, an optical signal (electric field complex information) of a wavelength $\lambda$r, among wavelengths included in reception WDM light, which corresponds to a reception desired channel, is detected and modulated.

Figure 4:
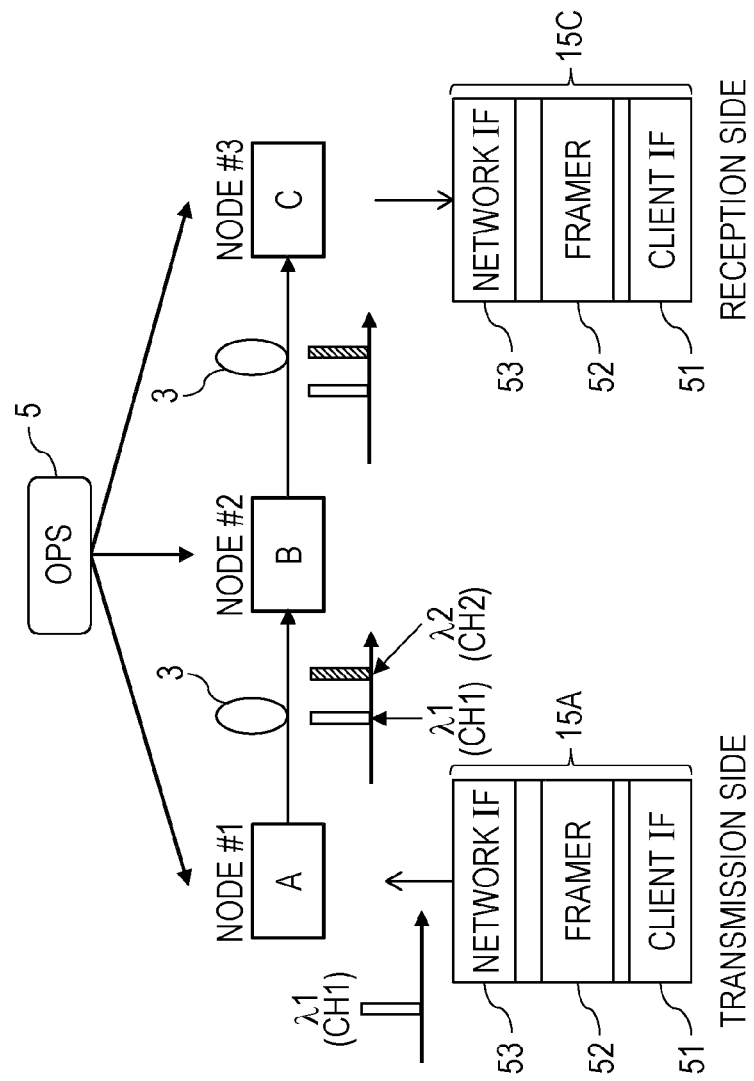
FIG. 4 is a block diagram illustrating a configuration example of an optical transmission system (an optical network) according to an embodiment.

Next, FIG. 4 illustrates an example of an optical transmission system (which may be referred to as an "optical network") including the above-described node 1. FIG. 4 illustrates an optical transmission system (which may be referred to as an "optical network") including three nodes A to C (#1 to #3) and an operation system (OPS) 5. Each of the nodes A to C may have a configuration that is the same as or similar to that of the above-described node 1.

FIG. 4 illustrates a state where optical communication with WDM light including a wavelength $\lambda$2 (CH2) is operated (worked) on an optical path extending via the node A, B, and C, and light of a wavelength $\lambda$1 (CH1) is added to the optical path at the node A.

The OPS 5 is capable of intensively supervisory-controlling the nodes A to C as example elements (NE) of an optical network, and performs setting regarding whether or not to perform adding, dropping, or letting pass-through on light of which wavelength at which one of the nodes A to C, control of wavelength defrag, and the like. It may be considered that the OPS 5 is an external controller (or a remote controller) for the nodes A to C.

A transponder 15A of the transmission node A illustratively includes a client interface (IF) 51, a framer 52, and a network interface (IF) 53. Note that a transponder 15C of the reception node C may have a configuration that is the same as or similar to that of the transponder 15A of the transmission node A.

The client IF 51 illustratively transmits and receives a signal (which may be referred to as a "client signal") with a communication device, such as a router and the like, at a client side (which may be referred to as a "tributary side") and light of a predetermined band (for example, a wide band: WB). Therefore, the client IF 51 may be also referred to as a WB module. The client signal transmitted and received with the WB light may be illustratively a frame signal used in a synchronous optical network (SONET), Ethernet (trademark), or the like.

For example, the client IF 51 converts WS light received from a client communication device to an electric signal and inputs the electric signal to the framer 52. Also, the client IF 51 converts the electric signal received from the framer 52 to WB light and transmits the WB light to the client communication device.

The framer 52 illustratively maps a signal photoelectric-converted by the client IF 51 to a frame signal transmitted through an optical network and inputs the obtained signal to a network IF 53. An example of the frame signal is an optical channel transport unit (OTU) frame signal.

Also, the framer 52 demaps a frame signal of SONET, Ethernet, or the like, and inputs the obtained signal to the client IF 51. Note that the frame signal is mapped, for example, to an OTU frame signal from the network IF 53. Frame signal processing may include processing of error correction code addition, or the like.

The network IF 53 illustratively transmits and receives a frame signal (for example, an OTN frame signal) with an optical transmission line with light of a predetermined band (for example, a narrow band: NB). Therefore, the network IF 53 may be referred to as an NB module 53.

The network IF 53 converts the OTU frame signal of an electric signal generated by the framer 52 to NB light and outputs the NB light to the multiplexer 142 illustrated in FIG. 1. The optical transmitter 152 illustrated in FIG. 3A may be used for conversion to the NB light.

In other words, it may be considered that the optical transmitter 152 illustrated in FIG. 3A is included in the network IF 53. Therefore, transmission NB light of a wavelength (for example, $\lambda 1$) generated by the optical transmitter 152 of the network IF 53 is output as add light to the multiplexer 142.

Also, the network IF 53 converts, for example, an OTN frame signal input as drop light of NB from the demultiplexer 141 illustrated in FIG. 1 to an electric signal and outputs the electric signal to the framer 52. The optical receiver 151 illustrated in FIG. 3B may be used for conversion to the electric signal.

In other words, it may be considered that the optical receiver 151 illustrated in FIG. 3B may be included in the network IF 53. Therefore, drop light is coherent-received at the optical receiver 151 of the network IF 53, and an electric signal including a frame signal (a client signal) of SONET or Ethernet is modulated.

As has been described above, the transponder 15A (15C) enables bidirectional communication between client communication devices via an optical network through conversion processing of light and a frame signal transmitted and received between the tributary side and an optical network (optical transmission line) side.

Next, defrag control with the OPS 5 will be described with reference to FIG. 5 and FIG. 6A through FIG. 6G. Defrag control is illustratively implemented by control in which the OPS 5 shifts a wavelength while synchronizing a transmission wavelength (an LD emission wavelength) of the transmission node A, a WSS pass band of a relay node B, and a reception wavelength (a local light LD emission wavelength) of the reception node C. Note that wavelength shift may be referred to as wavelength slide.

As a non-limiting example, as schematically illustrated in FIG. 5 (states a to d), a case where an optical signal of CH2 is operated (worked) and defrag is performed by wavelength-shifting an optical signal of CH1 located at a shorter wavelength side, as compared to CH2, to a long wavelength side will be described. Note that FIG. 5 illustrates a state where the optical signal of CH1 is wavelength-shifted to the long wavelength side in a stepwise fashion in a range (hitless) in which the optical signal of CH1 does not hit the optical signal of CH2 in operation (working).

First, the OPS 5 that supervises the entire optical network acts as a trigger for the nodes A to C relating to defrag control and starts a defrag operation. However, a trigger for defrag may be issued to another node relating to defrag control by one of the nodes A to C. In this case, information for defrag control may be exchanged between nodes relating to defrag control, and thus, the nodes may autonomously start defrag.

Each of the transmission node A, the relay node B, and the reception node C that received the trigger for defrag synchronization-controls a transmission wavelength of the optical transmitter 152, a pass band of the WSS 132, and a local light wavelength of the optical receiver 151 in the manner illustrated in FIG. 6A to FIG. 6G in accordance with control from the OPS 5. Note that, in FIG. 6A to FIG. 6G, $PB_{WSS}$ denotes a WSS pass band.

FIG. 6A schematically illustrates an example of a wavelength arrangement for the optical signals CH1 and CH2 before a start of defrag. The optical signal of CH1 passes through a WSS pass band $PB_{WSS}$ set at the nodes A to C.

In response to a start of defrag, each of the nodes A to C expansion-controls the WSS pass band $PB_{WSS}$ through which the optical signal of CH1 passes, for example, with the pass band control section 19 illustrated in FIG. 2.

A direction in which the WSS pass band $PB_{WSS}$ is expanded is a direction (a long wavelength side in this example) in which CH1 is desired to wavelength-shifted. The unit of expansion may be a band width (for example, 12.5 GHz) corresponding to a smallest variable unit of the WSS pass band $PB_{WSS}$. The band width corresponding to the smallest variable unit of the WSS pass band $PB_{WSS}$ may be referred to as a "WSS slot". It may be considered that the WSS slot corresponds to the smallest unit of a band width in which attenuation may be made variable in the WSS 132.

When expansion of the WSS pass band $PB_{WSS}$ is completed, as illustrated in FIG. 6C, the transmission node A shifts the transmission wavelength $\lambda t$ of the optical transmitter 152 to the long wavelength side. A shift amount may be set to an amount (for example, 2.5 GHz or less) in a range in which a penalty does not occur in reception optical signal in the optical receiver 151 of the reception node C. The wavelength shift may be controlled, for example, by the light source control section 1522 illustrated in FIG. 3A.

At the reception node C, the local light wavelength $\lambda r$ of the optical receiver 151 is shifted to the long wavelength side by an amount that is the same as the shift amount of the transmission wavelength $\lambda t$ in synchronization with shift of the transmission wavelength $\lambda t$ at the transmission node A.

When each of the transmission wavelength λt and the local light wavelength λr shifts to the long wavelength side by an amount corresponding to a WSS slot, each of the nodes A to C closes (controls to a non-pass band) a part of the WSS pass band $PB_{WSS}$ corresponding to the WSS slot at a short wavelength side. The above-described state is illustrated in FIG. 6D.

In other words, the WSS pass band $PB_{WSS}$ is reduced from the short wavelength side toward the long wavelength side by an amount corresponding to the WSS slot. Reduction of the WSS pass band $PB_{WSS}$ may be also controlled, for example, by the pass band control section 19 illustrated in FIG. 2.

Subsequently, the expansion of the WSS pass band $PB_{WSS}$, the wavelength shift, and the reduction of the WSS pass band $PB_{WSS}$ that are illustrated in FIG. 6B to FIG. 6D are repeated until CH1 reaches a target wavelength of defrag, as illustrated in FIG. 6E to 6G.

Next, an example of super channel transmission power control and defrag control will be described with reference to FIG. 7 to FIG. 11.

Figure 9:
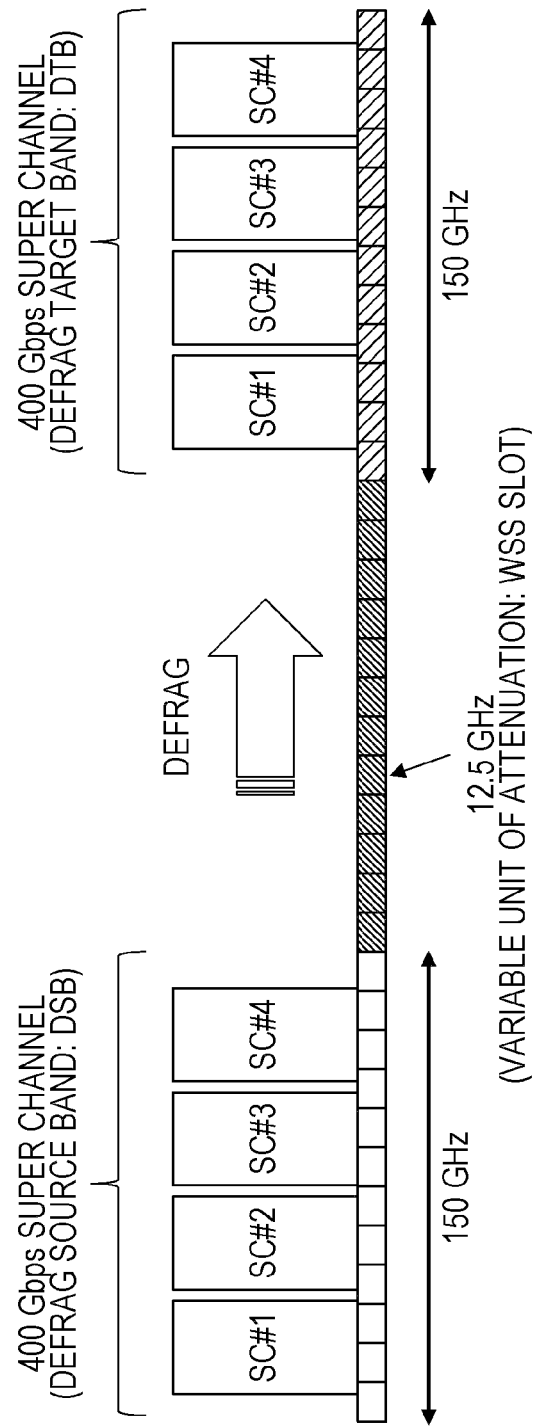
FIG. 9 is a diagram schematically illustrating an example of the relationship between a subcarrier arrangement and a variable unit for attenuation of WSS when wavelength defrag of a subcarrier of a super channel is performed.

As an example of a super channel, as illustrated in FIG. 9, a 400 Gbps super channel in which four 100 Gbps subcarriers SC#1 to SC#4 are wavelength-multiplexed is assumed.

As illustrated in FIG. 7, for example, a case where a super channel is transmitted from the transmission node A to the optical transmission line 3 with power of 0 dBm per subcarrier (SC) is assumed. In other words, a case where input optical power (Fin) to the optical transmission line 3 is 0 dBm/SC is assumed. Note that, in FIG. 7, a pre-amp 111 corresponds to the pre-amp 111 at the reception node C of FIG. 4.

Then, a case where the input optical power of a post-amp 121 at the transmission node A is controlled to target power Ptgt=−20 dBm/SC such that Fin=0 dBm/SC is achieved is assumed. The input optical power of the post-amp 121 may be set so as to be different for each SC in an actual situation, but for simplification, it is presumed herein that the input optical power is the same power (level) for each SC.

Input optical power of the post-amp 121 may be controlled by controlling output optical power of the WSS 132. For example, as illustrated in FIG. 2, the VOA control section 18 controls attenuation (a VOA loss) of the WSS 132 based on a monitor value of the OCM 17, thereby enabling implementation of control of output optical power of the WSS 132.

Figure 8:
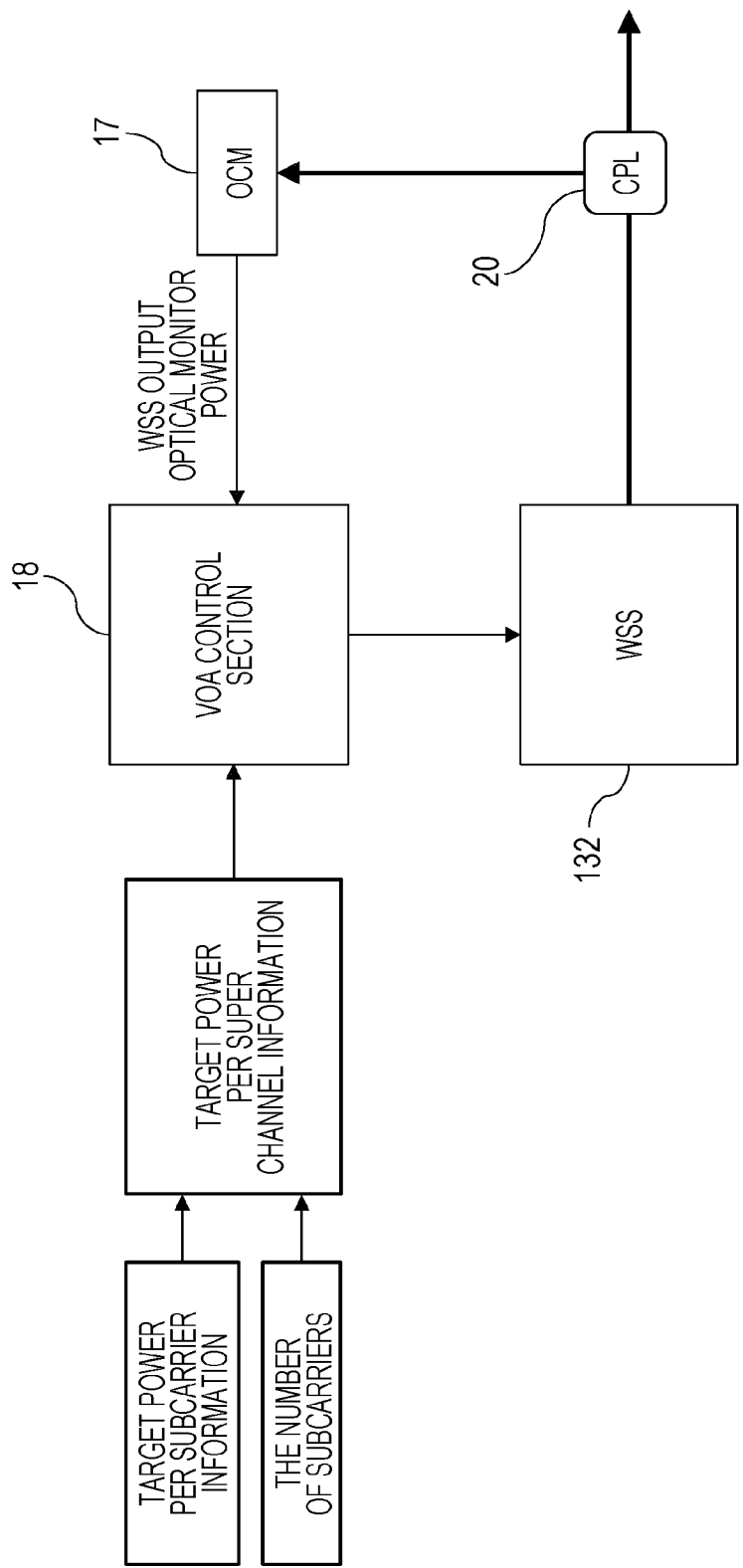
FIG. 8 is a block diagram illustrating an example of output optical power control of the optical transmission apparatus illustrated in FIG. 1.

For example, as schematically illustrated in FIG. 8, the VOA control section 18 feedback-controls the VOA loss such that the monitor value of the OCM 17 matches target power per super channel.

The target power per super channel may be obtained, for example, by multiplication of target power per subcarrier and the number of subcarriers per super channel.

In other words, the VOA control section 18 performs control of output optical power of the WSS 132 not in units of subcarrier but in units of super channel. The reason for that is as follows. That is, there might be cases where a plurality of subcarriers that form a super channel is not arranged at equal intervals in a pass band, and also there might be cases where subcarriers are not arranged at specified frequency grids, that is, at 6.25 GHz intervals or at intervals of an integral multiple of 12.5 GHz width.

Also, there might be cases where subcarriers are not arranged in units of WSS slot (12.5 GHz in the example of FIG. 9) corresponding to a pass band width for which the WSS 132 may make the attenuation thereof variable. Therefore, it is difficult and not realistic to control output optical power for each subcarrier.

In the future, if adjustment of the attenuation of the WSS 132 in units of smaller WSS slot is enabled due to increase in performance of the WSS 132, control of output optical power level in units of subcarrier might be enabled.

However, as the control unit is reduced, for example, control of LCOS, and the like, used for the WSS 132 might be complicated. Also, attenuation for each WSS slot is to tend to fluctuate depending on temperature, a wavelength, and the like, and therefore, calibration that performs adjustment for the fluctuation might be complicated.

Therefore, as illustrated in FIG. 7 and FIG. 8, it is considered preferable to collectively control the output optical power level in units of super channel which is formed by a plurality of subcarriers that have been put together.

In the example of FIG. 9, the four subcarriers SC#1 to SC#4 are collectively power-monitored and input optical target power of the post-amp 121 is set as the total for the four subcarriers SC#1 to SC#4.

For example, if input optical target power of the post-amp 121 per subcarrier is −20 dBm, the input optical target power of the post-amp 121 in units of super channel is −20 dBm×4 SC=−14 dBm. Note that, when the number of subcarriers is one, as a result, power uniform control for a single subcarrier alone is performed.

However, in the above-described power (level) uniform control in units of super channel, when the number of subcarriers is changed due to defrag, the target power deviates from an expected value.

For example, as illustrated in FIG. 9, a case where each of SC#1 to SC#4 of a super channel in a wavelength band is defragged by performing wavelength-shifting to a vacant wavelength band at a long wavelength side is assumed. Note that a wavelength band of a super channel of a defrag source may be referred to as a "defrag source band (DSB)", and a wavelength band of a super channel of a defrag destination may be referred to as a "defrag target band (DTB)". The defrag source band is an example of a first band, and the defrag target band is an example of a second band.

Figure 10:
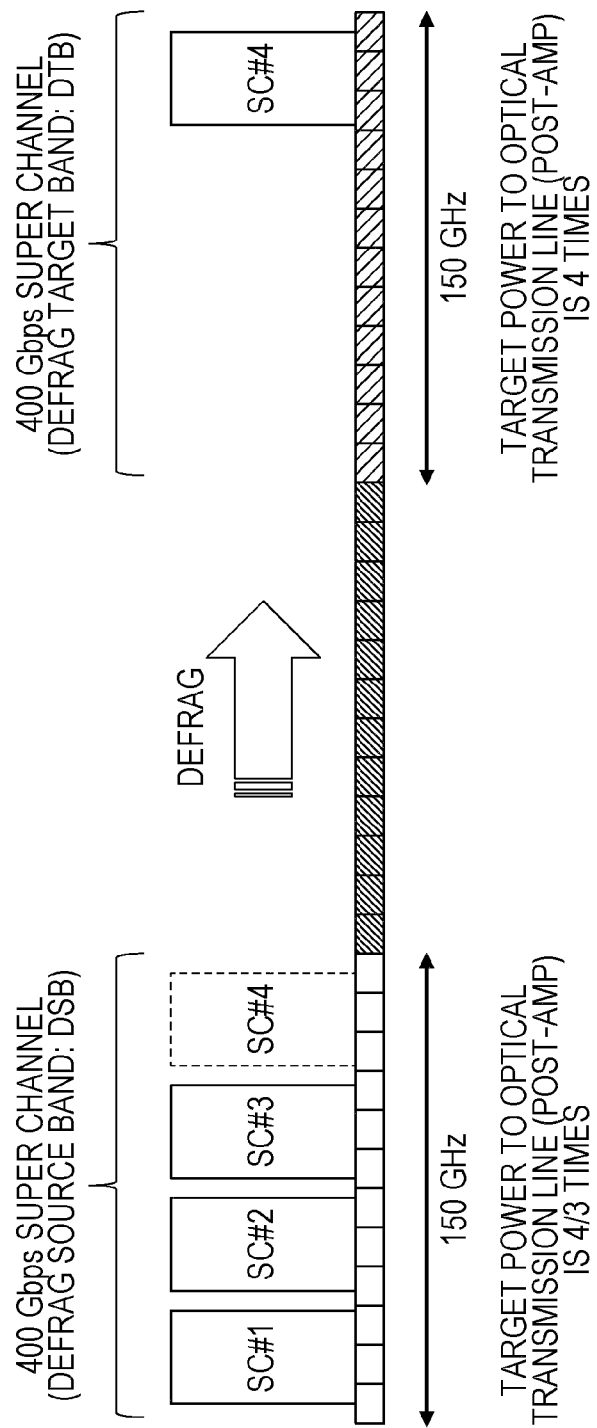
FIG. 10 is a diagram schematically illustrating that, in the example of FIG. 9, when wavelength defrag of a subcarrier of a super channel is performed, output optical power to an optical transmission line fluctuates.

Defrag to the defrag target band is implemented not in units of super channel but in units of subcarrier. Assume that, as illustrated in FIG. 10, one of four SC#1 to SC#4, that is, SC#4, is wavelength-shifted to the defrag target band.

In this case, the number of subcarriers in the defrag source band reduces from four to one. On the other hand, the number of subcarriers increases from zero to one.

Therefore, in the defrag source band, the input optical target power of the post-amp 121 per subcarrier, which is −20 dBm, is changed to 4/3 times thereof, and deviates from an expected value, that is, −20 dBm/SC. As a result, the output optical power to the optical transmission line 3 per subcarrier also deviates from an expected value (0 dBm/SC).

On the other hand, also in the defrag target band, the input optical target power of the post-amp 121 per subcarrier, which is −20 dBm, is changed to 4/1 times thereof, and therefore, the output optical power to the optical transmission line 3 per subcarrier deviates from an expected value.

Figure 11:
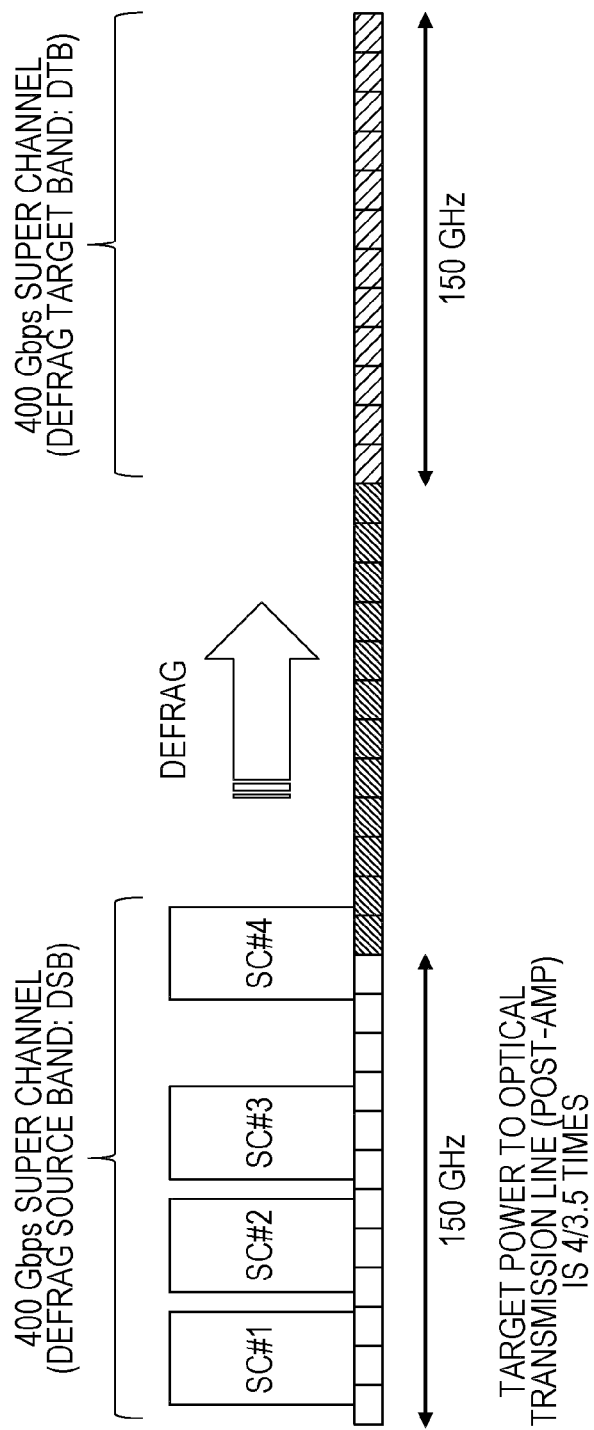
FIG. 11 is a diagram schematically illustrating that, in the example of FIG. 9, when wavelength defrag of a subcarrier of a super channel is performed, output optical power to an optical transmission line fluctuates.

Also, as illustrated in FIG. 11, when SC#4 is wavelength-shifted from the defrag source band to the defrag target band, a state where SC#4 overlaps the inside and outside of the defrag source band occurs. Also, in the defrag target band, a state where SC#4 overlaps the inside and outside of the defrag target band occurs.

In a state where SC#4 overlaps the inside and outside of the super channel such that the half of SC#4 is in the super channel and the other half of SC#4 is outside the super channel, the input optical target power of the post-amp 121 per subcarrier, which is −20 dBm, is changed to 4/3.5 times thereof. Therefore, the output optical power to the optical transmission line 3 per subcarrier deviates from an expected value.

When the output optical power to the optical transmission line 3 per subcarrier deviates from the expected value, a penalty of an optical signal due to non-linear effect increases, and OSNR is degraded. That is, the output optical power to the optical transmission line 3 fluctuates during defrag, and therefore, signal quality might be degraded.

Thus, in this embodiment, even during defrag of a super channel, fluctuation of the output optical power to the optical transmission line 3 is reduced, so that stable output optical power may be maintained. Thus, degradation of signal quality may be reduced.

For example, during defrag, attenuation due to the WSS 132 in the defrag source band is controlled so as to be uniform. Such uniform control may be implemented, for example, by maintaining (fixing) the attenuation of the WSS 132 at the attenuation before a start of defrag. The uniform control may be referred to as "loss uniform control".

Also, for a band between the defrag source band and the defrag target band during defrag, level uniform control for a single subcarrier is performed. The uniform control may be referred to as "subcarrier level uniform control".

Furthermore, for the defrag target band during defrag, the output optical power (level) is controlled in units of super channel, based on the number of subcarriers, so as to be uniform. Level uniform control in units of super channel may be referred to as "super channel level uniform control".

As has been described above, during defrag, the output optical power control is optimized in three bands, that is, the defrag source band, the band between the defrag source band and the defrag target band, and the defrag target band. Thus, even when the number of subcarriers of a super channel is changed with defrag, the output optical power to the optical transmission line 3 may be controlled so as to be uniform.

Note that, before a start of defrag and after an end of defrag, as illustrated in FIG. 7 and FIG. 8, the output optical power level may be collectively controlled in units of super channel which is formed by a plurality of subcarriers that have been put together.

First Working Example

Figure 12:
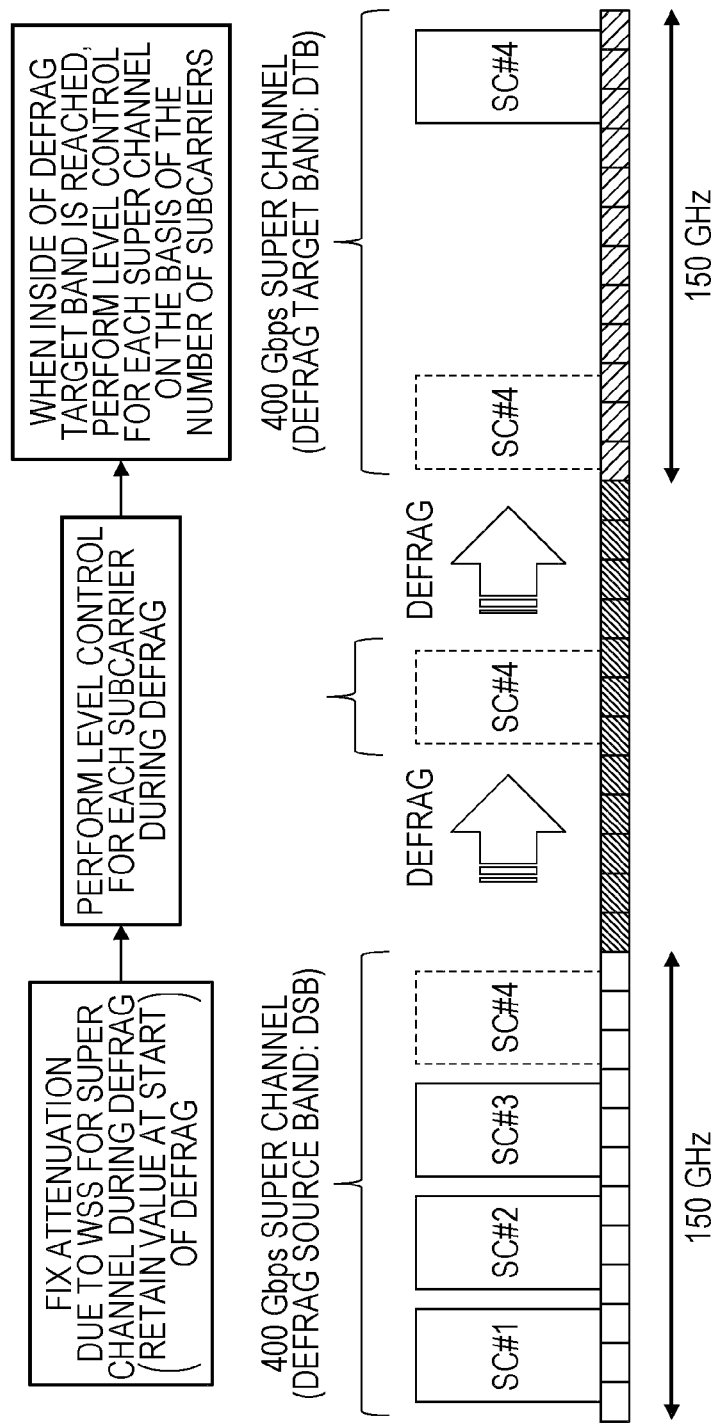
FIG. 12 is a diagram schematically illustrating a first working example in which, in the example of FIG. 9, when wavelength defrag of a subcarrier of a super channel is performed, output optical power to an optical transmission line is controlled separately for each wavelength band.

FIG. 12 illustrated a first working example. Before a start of defrag, the VOA control section 18 performs super channel level uniform control. That is, as illustrated in the upper portion of FIG. 13, the VOA control section 18 calculates, based on WSS output target power per subcarrier and the number of subcarriers, WSS output target power per super channel.

For example, when the WSS output target power per subcarrier is −20 dBm/SC and the number of subcarriers is four, the WSS output target power of a super channel is −14 dBm (−20 dBm×4).

Therefore, the VOA control section 18 controls the attenuation of the WSS 132 such that the monitor value of the OCM 17 matches −14 dBm.

Figure 13:
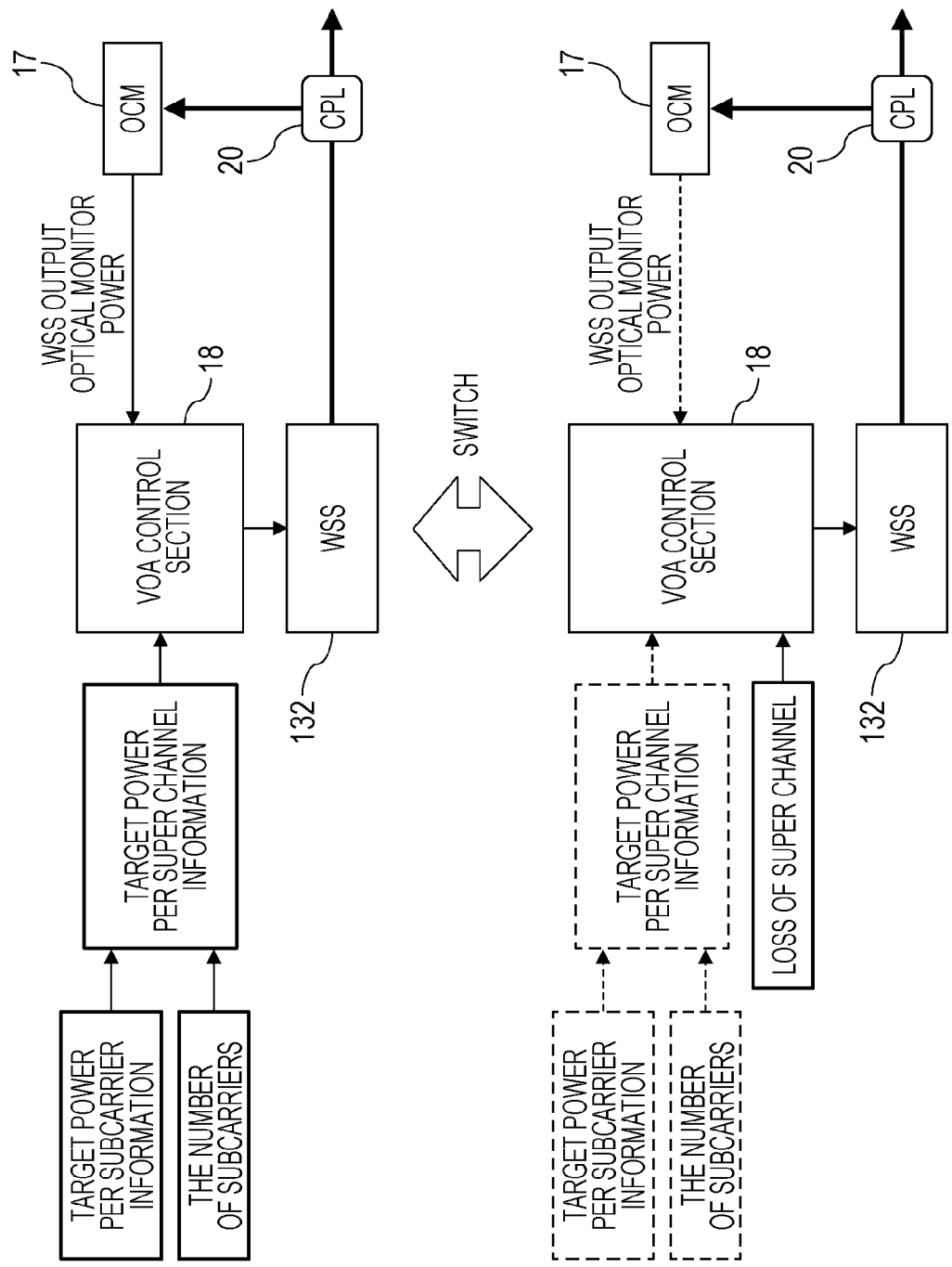
FIG. 13 is a block diagram illustrating an implementation example of output optical power control separately performed for each wavelength band at the time of wavelength defrag illustrated in FIG. 12.

During defrag, as illustrated in the lower portion of FIG. 13, the VOA control section 18 switches super channel level uniform control to loss uniform control. That is, the VOA control section 18 controls the attenuation of the WSS 132 for a super channel of the defrag source band such that the attenuation is fixed.

In other words, the VOA control section 18 stops performing feedback control of the VOA loss such that the monitor value of the OCM 17 matches the target power per super channel, and switches the feedback control to control in which the loss of the super channel is fixed at the attenuation at the start of defrag.

For example, the VOA control section 18 determines, based on the loss of the super channel at the start of defrag, the loss of a target subcarrier to control the attenuation of the WSS 132. Thus, even when the number of subcarriers in the defrag source band is changed (is reduced), the output optical power in units of super channel may be caused not to fluctuate.

Note that, at normal time, a super channel is illustratively level uniform controlled. Therefore, the "loss at a start of defrag" may be obtained by retaining the loss at the time when the super channel is level uniform controlled at normal time before a start of defrag in a memory or the like. Loss uniform control may be implemented using the retained loss.

When a subcarrier being wavelength-shifted in defrag is in a band between the defrag source band and the defrag target band, the VOA control section 18 performs WSS output power control on the band not in units of super channel but for a subcarrier alone. Note that the control may be referred to as "subcarrier level uniform control".

On the defrag target band that the subcarrier being wavelength-shifted in defrag reaches, the VOA control section 18 performs WSS output optical power control in units of super channel based on the number of subcarriers in the defrag target band.

For example, when the WSS output target power per subcarrier is −20 dBm/SC and the number of subcarriers is N (where N is a natural number), the WSS output target power in units of super channel in the defrag target band is −20 dBm×N.

When all of subcarriers have been wavelength-shifted into the defrag target band, the VOA control section 18 performs control similar to control performed before the start of defrag, which is illustrated in the upper portion of FIG. 13. That is, the VOA control section 18 calculates the WSS output target power per super channel based on the WSS target power per subcarrier and the number of subcarriers. Then, the VOA control section 18 controls the attenuation of the WSS 132 such that the monitor value of the OCM 17 matches the target power obtained by calculation.

Figure 14:
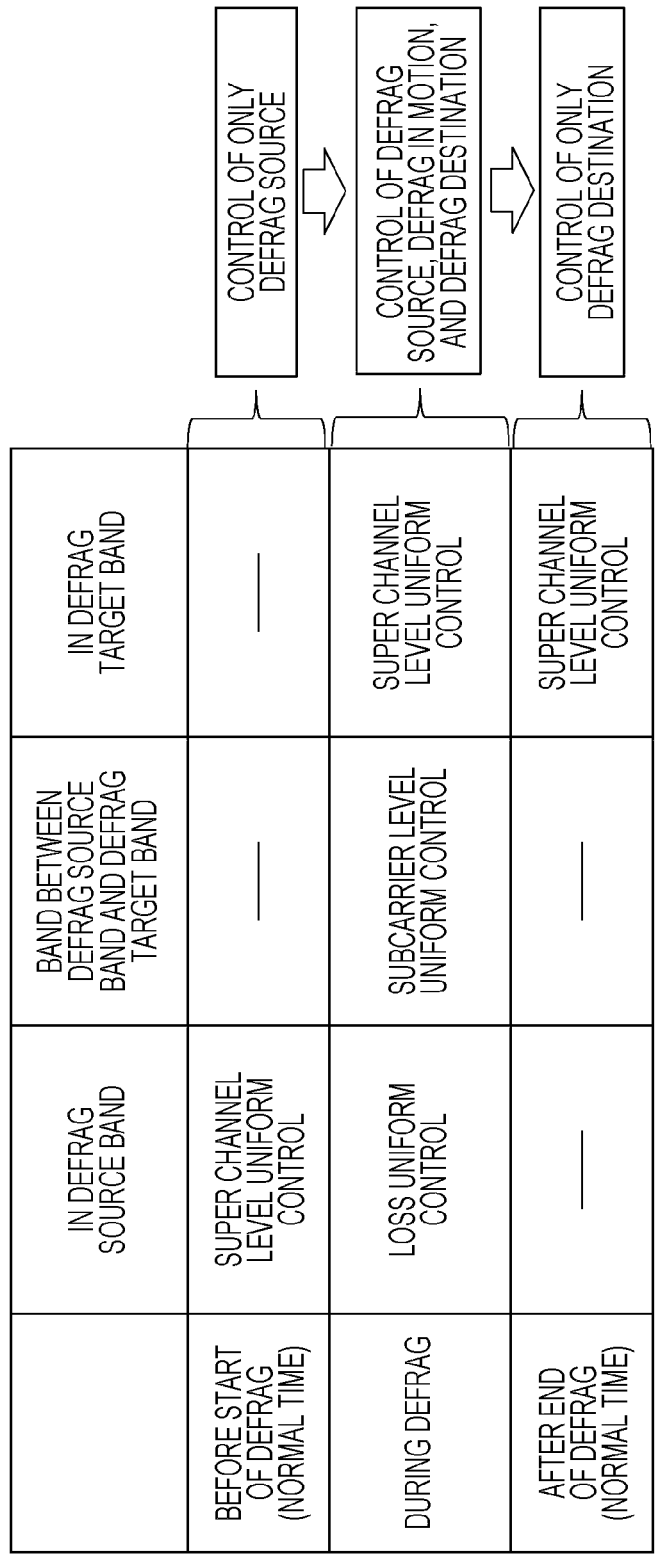
FIG. 14 is a table illustrating a summary of output optical power control separately performed for each wavelength band illustrated in FIG. 12.

FIG. 14 is a table illustrating a summary of examples of WSS output optical power control separately performed on different bands, which have been described above. As illustrated in FIG. 14, before a start of defrag, the VOA control section 18 performs "super channel level uniform control" only on one of the three bands, that is, the defrag source band.

Also, during defrag, the VOA control section 18 performs "loss uniform control", "subcarrier level uniform control", and "super channel level uniform control" on the three bands, respectively.

Furthermore, after an end of defrag, the VOA control section 18 performs "super channel level uniform control" only on one of the three bands, that is, the defrag target band.

As has been described above, at the time of defrag, in each of the three bands, WSS output optical power control may be optimized in accordance with change of the subcarrier number. Therefore, even when subcarriers that form a super channel is defragged, the WSS output optical power, in other words, the output optical power to the optical transmission line 3, may be stably controlled so as to be uniform. Therefore, degradation of signal quality caused by increase in penalty of an optical signal due to the nonlinear effect of the optical transmission line 3 and degradation of OSNR may be reduced.

Second Working Example

Next, an example of transmission optical power (level) control for a super channel when a state where a subcarrier overlaps inside and outside of a super channel in the course of defrag as illustrated in FIG. 11 will be described with reference to FIG. 15 to FIG. 18.

Before a start of defrag, the VOA control section 18 performs super channel level uniform control. That is, as illustrated in the upper portion of FIG. 13, the VOA control section 18 calculates, based on WSS output target power per subcarrier and the number of subcarriers, WSS output target power per super channel.

When the WSS output target power per subcarrier is −20 dBm/SC and the number of subcarriers N=4, the WSS output target power of a super channel is −14 dBm (−20 dBm×4).

Therefore, the VOA control section 18 controls the attenuation of the WSS 132 such that the monitor value of the OCM 17 matches −14 dBm.

As illustrated in the lower portion of FIG. 13, the VOA control section 18 switches to control in which the attenuation of the WSS 132 for a super channel of the defrag source band is fixed.

Figure 15:
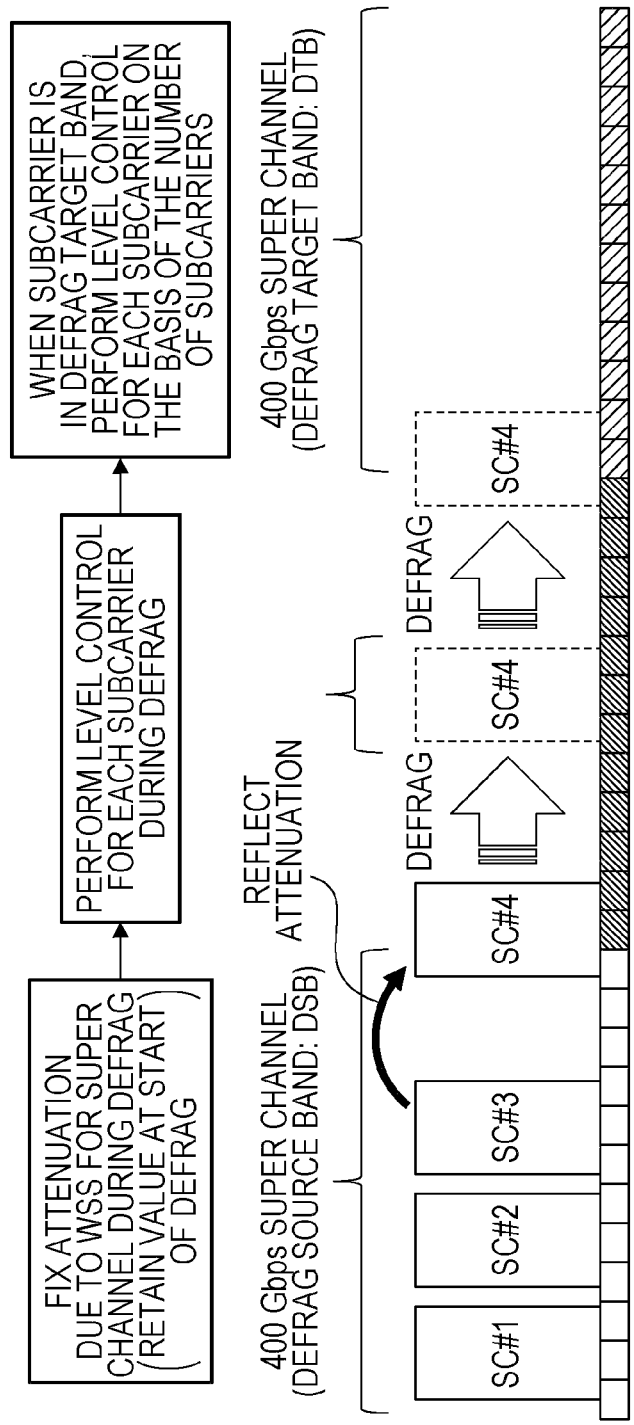
FIG. 15 is a diagram schematically illustrating a second working example in which, in the example of FIG. 9, when wavelength defrag of a subcarrier of a super channel is performed, output optical power to an optical transmission line is controlled separately for each wavelength band.

First, a case where, as illustrated in FIG. 15, among SC#1 to SC#4 that form a super channel of the defrag source band, SC#4 is defragged (wavelength-shifted) to the defrag target band will be described.

When SC#4 is in the defrag source band, the VOA control section 18 performs loss uniform control on the super channel (SC#1 to SC#4) in the defrag source band. That is, the VOA control section 18 performs fixation control on the attenuation of the WSS 132 for the super channel of the defrag source band to fix the attenuation at the attenuation at the start of defrag.

In the course of wavelength shift of SC#4, SC#4 overlaps WSS slots in and outside the defrag source band, the VOA control section 18 performs loss uniform control on the WSS slots. For example, the VOA control section 18 maintains (fixes) the attenuations of the WSS slots in which the SC#4 is located at the attenuation of the defrag source band.

In other words, the VOA control section 18 controls the attenuations of the WSS slots in and outside the defrag source band in which SC#4 is located such that the attenuations are the same as the attenuation of the WSS 132 in the defrag source band.

Thereafter, when SC#4 goes out the defrag source band, the VOA control section 18 performs subcarrier level uniform control on the band off which the SC#4 has gone. That is, the VOA control section 18 performs WSS output optical power control not in units of super channel but for SC#4 alone.

When SC#4 is further wavelength-shifted and overlaps WSS slots in and outside of the defrag target band, the VOA control section 18 performs subcarrier level uniform control on the WSS slots. That is, the VOA control section 18 performs WSS output optical power control not in units of super channel but for SC#4 alone.

Thereafter, when SC#4 is wavelength-shifted into the defrag target band, super channel level uniform control is performed. That is, the VOA control section 18 performs, based on the number of subcarriers in the defrag target band, WSS output optical power control in units of super channel.

For example, when the WSS output target power per subcarrier is −20 dBm/SC and the number of subcarriers is one (SC#4), the WSS output target power in units of super channel is −20 dBm (−20 dBm×1).

Figure 16:
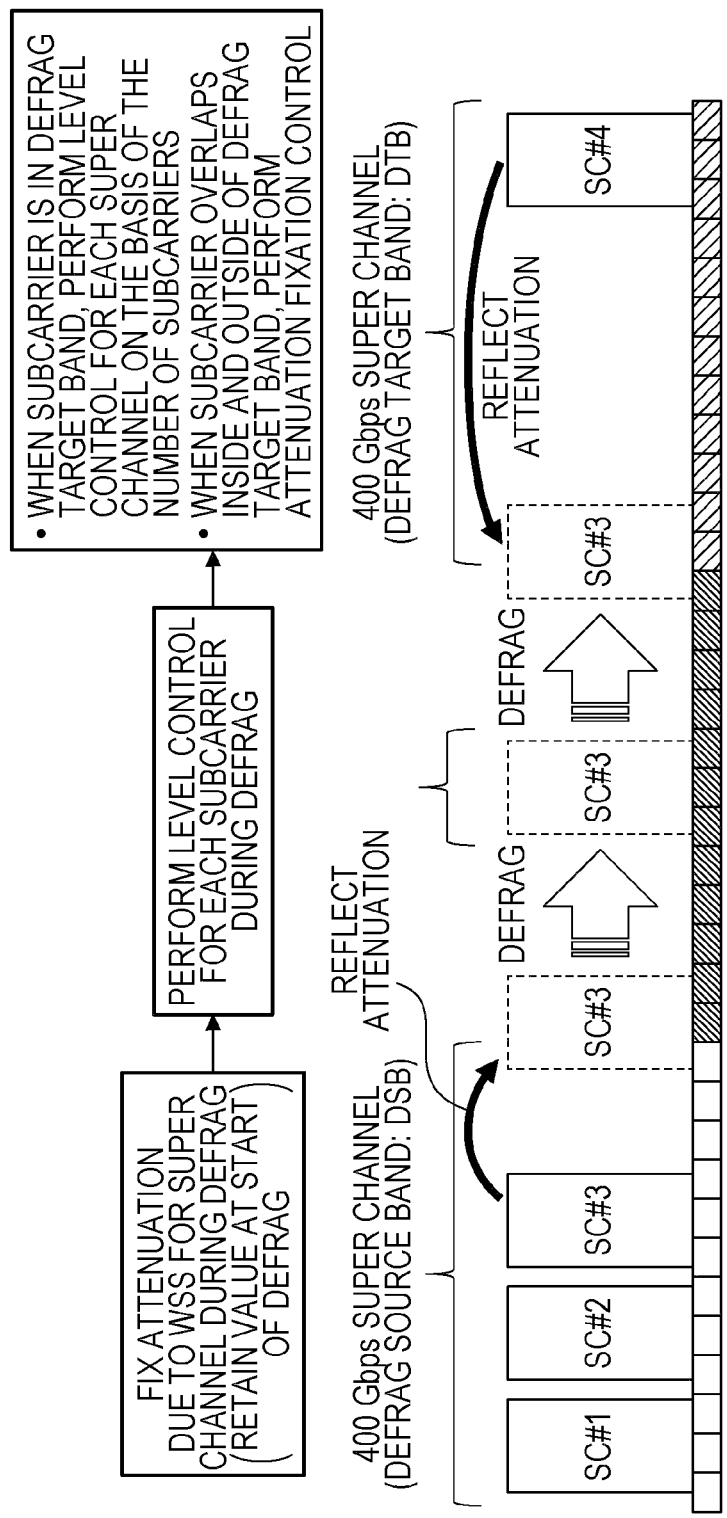
FIG. 16 is a diagram schematically illustrating output optical power control according to the second working example.

Next, as illustrated in FIG. 16, a case where SC#3 is wavelength-shifted from the defrag source band to the defrag target band will be described.

When SC#3 is in the defrag source band, the VOA control section 18 performs loss uniform control for a super channel (SC#1 to SC#3) of the defrag source band.

When SC#3 overlaps WSS slots in and outside the defrag source band, the VOA control section 18 performs loss uniform control on the WSS slots. For example, the VOA control section 18 maintains (fixes) the attenuations of the WSS slots in which SC#3 is located at the attenuation of the WSS 132 of the defrag source band.

In other words, the VOA control section 18 controls the attenuations of the WSS slots outside the defrag source band in which SC#4 is located such that the attenuations are the same as the attenuation of the WSS 132 in the defrag source band.

Thereafter, when SC#3 goes out the defrag source band, the VOA control section 18 performs subcarrier level uniform control on the band between the defrag source band and the defrag target band. That is, the VOA control section 18 performs WSS output optical power control not in units of super channel but for SC#3 alone.

When SC#3 is further wavelength-shifted and overlaps WSS slots in and outside of the defrag target band, the VOA control section 18 continues subcarrier level uniform control on the WSS slots. That is, the VOA control section 18 performs WSS output optical power control not in units of super channel but for SC#3 alone.

Thereafter, when SC#3 is wavelength-shifted into the defrag target band, super channel level uniform control is performed on the defrag target band. That is, the VOA control section 18 performs, based on the number of subcarriers in the defrag target band, WSS output optical power control in units of super channel.

For example, when the WSS output target power per subcarrier is −20 dBm/SC and the number of subcarriers is two (SC#3 and SC#4), the WSS output target power of a super channel is −17 dBm (−20 dBm×2).

Note that WSS output optical power control performed when SC#2 is wavelength-shifted from the defrag source band to the defrag target band is similar to that for the SC#3.

Figure 17:
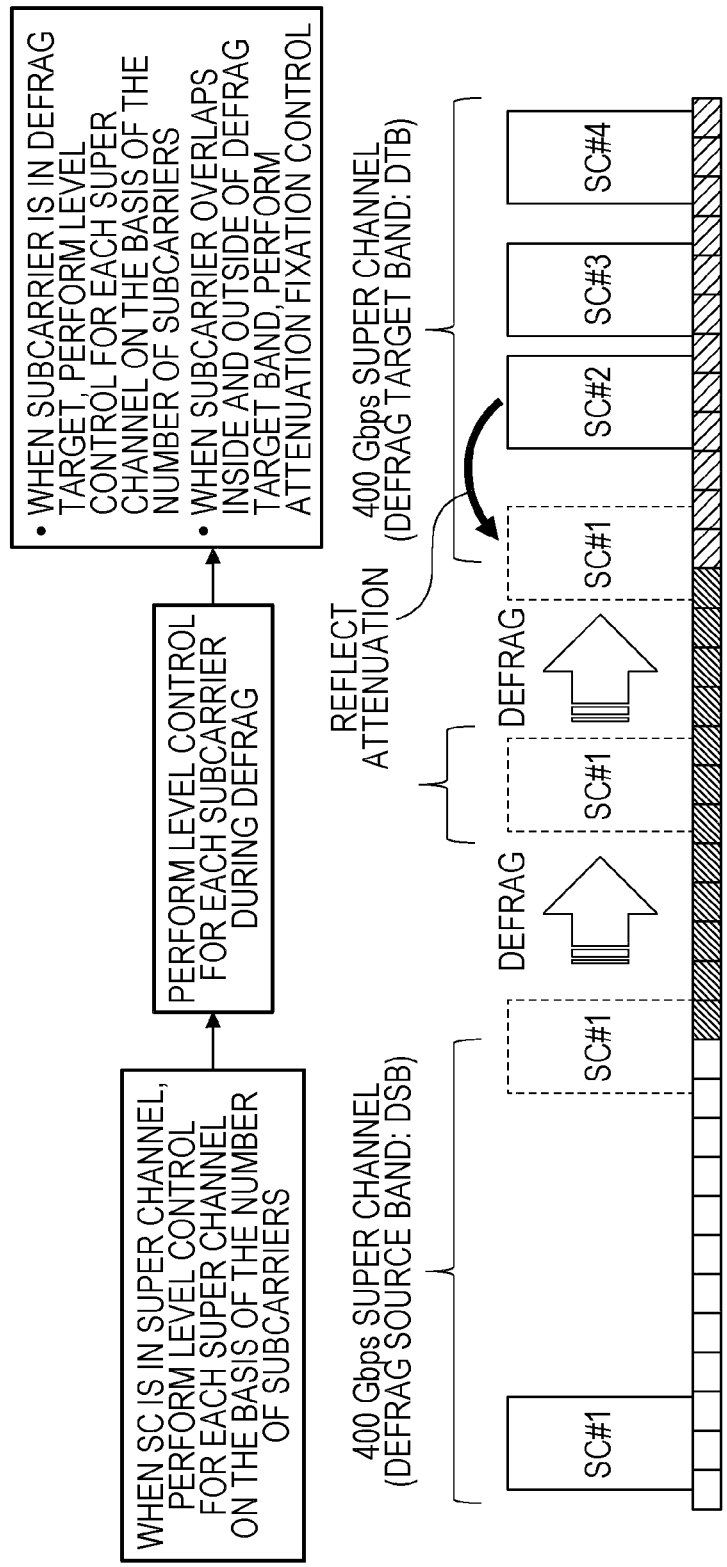
FIG. 17 is a diagram schematically illustrating output optical power control according to the second working example.

Next, a case where, as illustrated in FIG. 17, SC#1 is wavelength-shifted from the defrag source band to the defrag target band will be described.

When SC#1 is in the defrag source band, the VOA control section 18 performs super channel level uniform control. That is, the VOA control section 18 performs, based on the number of subcarriers in the defrag target band, WSS output optical power control in units of super channel.

For example, when the WSS output target power per subcarrier is −20 dBm/SC and the number of subcarriers is one (SC#1), the WSS output target power as a super channel is −20 dBm (−20 dBm×1).

Thereafter, when SC#1 overlaps WSS slots in and outside the defrag source band, subcarrier level uniform control is performed on the WSS slots. That is, the VOA control section 18 performs WSS output optical power control not in units of super channel but for SC#1 alone.

Thereafter, when SC#1 goes out the defrag source band, the VOA control section 18 performs subcarrier level uniform control on the band between the defrag source band and the defrag target band. That is, the VOA control section 18 performs WSS output optical power control not in units of super channel but for SC#1 alone.

When SC#1 is further wavelength-shifted and overlaps WSS slots in and outside of the defrag target band, the VOA control section 18 performs loss uniform control on the WSS slots. For example, the VOA control section 18 maintains (fixes) the attenuations of the WSS slots in which SC#1 is located at the attenuation of the WSS 132 of the defrag target band.

In other words, the VOA control section 18 controls the attenuations of the WSS slots outside the defrag target band in which SC#1 is located such that the attenuations are the same as the attenuation in the defrag target band.

Thereafter, when SC#1 is wavelength-shifted into the defrag target band, super channel level uniform control is performed. That is, the VOA control section 18 performs, based on the number of subcarriers in the defrag target band, WSS output optical power control in units of super channel.

For example, when the WSS output target power per subcarrier is −20 dBm/SC and the number of subcarriers is four (SC#1 to SC#4), the WSS output target power of a super channel is −14 dBm (−20 dBm×4).

FIG. 18 is a table illustrating a summary of examples of WSS output optical power control separately performed on different bands, which have been described above. As illustrated in FIG. 18, before a start of defrag, the VOA control section 18 performs "super channel level uniform control" only on one of five bands, that is, the defrag source band.

During defrag of SC#4, the VOA control section 18 performs "loss uniform control", "loss uniform control", "subcarrier level uniform control", "subcarrier level uniform control", and "super channel level uniform control" on the five bands, respectively.

During defrag of SC#3 (the same applies to SC#2), the VOA control section 18 performs "loss uniform control", "loss uniform control", "subcarrier level uniform control", "loss uniform control", and "super channel level uniform control" on the five bands, respectively.

During defrag of SC#1, the VOA control section 18 performs "super channel level uniform control", "subcarrier level uniform control", "subcarrier level uniform control", "loss uniform control", and "super channel level uniform control" on the five bands, respectively.

After an end of defrag, the VOA control section 18 performs "super channel level uniform control" only on one of the five bands, that is, the defrag target band.

As has been described above, in the course of defrag, in a situation where a subcarrier overlaps WSS slots in and outside the defrag source band (or defrag target), loss uniform control or subcarrier level uniform control is implemented on the WSS slots.

Therefore, in addition to similar advantages to those of the first working example, an advantage in which, even when subcarriers are not arranged at intervals of 6.25 GHz width or at intervals of an integral multiple of 12.5 GHz width, the output optical power to the optical transmission line 3 may be stably controlled so as to be uniform may be achieved. In other words, the above-described WSS output optical power control may be applicable even when the flexible grid particle size is smaller than 6.25 GHz, and degradation of signal quality at the time of defrag may be reduced.

Note that FIG. 19A and FIG. 19B illustrate examples of wavelength setting (which may be referred to as "wavelength allocation") before and after defrag. In FIG. 19A illustrates an example of wavelength setting between the nodes A and D before a start of defrag and FIG. 19B illustrates an example of wavelength setting between the nodes A and D after an end of defrag.

In FIG. 19A, four wavelengths #4-1 to #4-4 are illustratively set for an optical path extending via the nodes A, B and C. The four wavelengths #4-1 to #4-4 correspond to four subcarriers (SC) that form a single super channel. Also, a single wavelength #1 is set for an optical path extending between the nodes B and C. Furthermore, three wavelengths #0, #2, and #3 are set between the nodes C and D.

In the example of wavelength setting illustrated in FIG. 19A, when a super channel (four SC#4-1 to SC#4-4) of a defrag source band DSB is, for example, made as described above and is defragged to the defrag target band DTB, an example of subcarrier setting illustrated in FIG. 19B is obtained.

Therefore, a large vacant band may be ensured in the defrag source band DSB between adjacent nodes of the nodes A to D. A wavelength (an optical path) for which a new optical signal is transmitted may be allocated in the vacant band.

The above-described embodiment including the first and second working examples is applicable to overall WDM networks, in general, and is applicable to any form of an optical network, such as a ring network, a point-to-point network, a mesh network, and the like.

In other words, the above-described embodiment may be applied not only to an optical add-drop multiplexer (OADM) but also to an optical line terminal apparatus (a terminal) and an optical relay apparatus (an express node that does not have an add/drop function). Furthermore, the above-described embodiment is applicable to an optical transmission apparatus having any one of a color-less function, a direction-less function, and a contention-less function.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical transmission apparatus, comprising:
a set of variable optical attenuators configured to independently adjust, for each respective light of a plurality of lights at a plurality of wavelengths, attenuation of the respective light, to thereby adjust output optical power of a wavelength multiplexed light that includes the plurality of lights and is output to an optical transmission line; and
a control section including a processor, a field-programmable gate array and/or a circuit, configured to stop, in accordance with control in which a light of the plurality of lights in a first wavelength band is wavelength-shifted to a second wavelength band that is different from the first wavelength band, the adjusting attenuation by the set of variable optical attenuators of lights of the plurality of lights in the first wavelength band so that the set of variable optical attenuators provides a fixed attenuation to the lights of the plurality of lights in the first wavelength band at a same attenuation level as prior to the light being wavelength-shifted.

2. The optical transmission apparatus according to claim 1,
wherein, while the light being wavelength s0hifted is located in a third wavelength band between the first wavelength band and the second wavelength band in a course of the wavelength shifting, the control section controls the set of variable optical attenuators to attenuate light of the plurality of lights in the third wavelength band in units of wavelength.

3. The optical transmission apparatus according to claim 2,
wherein, when the light being wavelength shifted is located in the second wavelength band due to the wavelength shifting, the control section controls the set of variable optical attenuators to attenuate lights of the plurality of lights in the second wavelength band in accordance with the number of lights located in the second wavelength band.

4. The optical transmission apparatus according to claim 2,
wherein, when the light being wavelength shifted overlaps the first wavelength band and the third wavelength band in the course of the wavelength shifting, the control section controls the set of variable optical attenuators to stop the adjusting attenuation of lights of the plurality of lights in the first wavelength band and the third wavelength band.

5. The optical transmission apparatus according to claim 2,
wherein, when the light being wavelength shifted overlaps the third wavelength band and the second wavelength band in the course of the wavelength shifting, the control section controls the set of variable optical attenuators to stop the adjusting attenuation of lights in third wavelength band and the second wavelength band is stopped.

6. The optical transmission apparatus according to claim 1,
wherein the wavelength multiplexed light is light of a super channel in which lights of the plurality of lights in the first wavelength band are subcarriers, and
the wavelength shift is defragmentation of a subcarrier of the super channel to the second wavelength band.

7. An optical transmission control method comprising:
independently adjusting, by a set of variable optical attenuators, for each respective light of a plurality of lights at a plurality of wavelengths, attenuation of the respective light, to thereby adjust output optical power of a wavelength multiplexed light that includes the plurality of lights and is output to an optical transmission line; and
stopping, in accordance with control in which a light of the plurality of lights in a first wavelength band is wavelength-shifted to a second wavelength band that is different from the first wavelength band, the adjusting attenuation of lights of the plurality of lights in the first wavelength band by the set of variable optical attenuators so that the set of variable optical attenuators provides a fixed attenuation to the lights of the plurality of lights in the first wavelength band at a same attenuation level as prior to the light being wavelength-shifted.

8. An optical transmission apparatus comprising:
a wavelength selection switch configured to independently adjust, for each respective light of a plurality of lights at a plurality of wavelengths, attenuation of the respective light, to thereby adjust output optical power of a wavelength multiplexed light that includes the plurality of lights and is output to an optical transmission line; and
a control section, including a processor, a field-programmable pate array, and/or a circuit, configured to stop, in accordance with control in which a light of the plurality of lights in a first wavelength band is wavelength-shifted to a second wavelength band that is different from the first wavelength band, the adjusting attenuation by the wavelength selection switch of lights of the plurality of lights in the first wavelength band so that the wavelength selection switch provides a fixed attenuation to the lights of the plurality of lights in the first wavelength band at a same attenuation level as prior to the light being wavelength-shifted.

9. The optical transmission apparatus according to claim 8, wherein the wavelength selection switch includes a set of variable optical attenuators to adjust attenuation the plurality of lights.

* * * * *